(12) United States Patent
Shridhar et al.

(10) Patent No.: US 12,454,280 B2
(45) Date of Patent: Oct. 28, 2025

(54) METRICS FOR EVALUATING AUTONOMOUS VEHICLE PERFORMANCE

(71) Applicant: Aurora Operations, Inc., Pittsburgh, PA (US)

(72) Inventors: Skanda Shridhar, Pittsburgh, PA (US); Yuhang Ma, Pittsburgh, PA (US); Tara Lynn Stentz, Pittsburgh, PA (US); Zhengdi Shen, Pittsburgh, PA (US); Galen Clark Haynes, Pittsburgh, PA (US); Neil Traft, Burlington, VT (US)

(73) Assignee: Aurora Operations, Inc., Pittsburgh, PA (US)

( * ) Notice: Subject to any disclaimer, the term of this patent is extended or adjusted under 35 U.S.C. 154(b) by 573 days.

(21) Appl. No.: 17/492,142

(22) Filed: Oct. 1, 2021

(65) Prior Publication Data

US 2022/0105955 A1 Apr. 7, 2022

Related U.S. Application Data

(60) Provisional application No. 63/086,306, filed on Oct. 1, 2020.

(51) Int. Cl.
*B60W 60/00* (2020.01)
*B60W 40/08* (2012.01)
(Continued)

(52) U.S. Cl.
CPC .......... *B60W 60/001* (2020.02); *B60W 40/08* (2013.01); *B60W 40/10* (2013.01);
(Continued)

(58) Field of Classification Search
CPC .... B60W 60/001; B60W 40/08; B60W 40/10; B60W 2040/0881; B60W 2540/01;
(Continued)

(56) References Cited

U.S. PATENT DOCUMENTS 11,126,180 B1 * 9/2021 Kobilarov ........... B60W 30/095
11,243,532 B1 * 2/2022 Levihn .................. G06N 3/045
(Continued)

FOREIGN PATENT DOCUMENTS

WO  WO-2020061258 A1 *  3/2020  ............. G01C 21/20

OTHER PUBLICATIONS

International Search Report and Written Opinion for Application No. PCT/US2021/053067, mailed Feb. 2, 2022, 13 pages.
(Continued)

*Primary Examiner* — Anne Marie Antonucci
*Assistant Examiner* — Connor L Knight
(74) *Attorney, Agent, or Firm* — Dority & Manning, P.A.

(57) ABSTRACT

Systems and methods for generating performance metrics for autonomous vehicle systems are provided. The performance metrics include two complementary metrics that evaluate a machine-learning object prediction model relative to a number of potential trajectories of an autonomous vehicle. The performance metrics include an avoidance metric that quantifies a probability that a region occupied by a real-world or simulated object is reached by the autonomous vehicle, the region is not blocked by another object, and the region is not blocked by a prediction output by the machine-learning object prediction model. The performance metrics also include an availability metric that quantifies a probability that a simulated or real-world object is not located within a region, the region is not blocked by another simulated or real-world object, and the autonomous vehicle is unnecessarily blocked by the prediction output before the autonomous vehicle reaches the particular footprint.

20 Claims, 11 Drawing Sheets

(51) Int. Cl.
 B60W 40/10 (2012.01)
 G06N 20/00 (2019.01)
(52) U.S. Cl.
 CPC ..... G06N 20/00 (2019.01); *B60W 2040/0881* (2013.01); *B60W 2540/01* (2020.02); *B60W 2554/4049* (2020.02)
(58) Field of Classification Search
 CPC .... B60W 2554/4049; B60W 60/00276; G06N 20/00; G08G 1/0129; G08G 1/166; G08G 1/165; G05D 1/0217; G05D 1/0221; G05D 1/024; G05D 1/0274; G05D 2201/0213; G06V 20/56
 See application file for complete search history.

(56) References Cited

U.S. PATENT DOCUMENTS

| | | | | |
|---|---|---|---|---|
| 11,727,690 | B2* | 8/2023 | Bansal | G06V 10/764 701/45 |
| 2019/0122037 | A1 | 4/2019 | Russell et al. | |
| 2020/0150665 | A1* | 5/2020 | Refaat | B60W 60/0027 |
| 2020/0174481 | A1* | 6/2020 | Van Heukelom | B60W 60/0015 |
| 2020/0189573 | A1* | 6/2020 | King | G06V 20/58 |
| 2020/0208983 | A1* | 7/2020 | Wang | G01C 21/3461 |
| 2021/0354690 | A1* | 11/2021 | Yershov | G05D 1/0217 |

OTHER PUBLICATIONS

Bansal et al., "Chauffeurnet: Learning to Drive by Imitating the Best and Synthesizing the Worst", Dec. 7, 2018, arxiv.org, arxiv:1812.03079v1, 20 pages.
Becker et al., "An RNN-Based IMM Filter Surrogate", 2019, Scandinavian Conference on Image Analysis, Apr. 26, 2019, arxiv.org, arxiv:1902.01739v2, 12 pages.
Becker et al., "Red: a Simple but Effective Baseline Predictor for the Trajnet Benchmark", Proceedings of the European Conference on Computer Vision, 2018, 16 pages.
Casas et al., "Intentnet: Learning to Predict Intention from Raw Sensor Data", Second Conference on Robot Learning, Zurich, Switzerland, 2018, pp. 947-956.
Chai et al., "Multipath: Multiple Probabilistic Anchor Trajectory Hypotheses for Behavior Prediction", 2019, arxiv.org, arXiv:1910.05449v1, 14 pages.
Cui et al., "Multimodal Trajectory Predictions for Autonomous Driving Using Deep Convolutional Networks", Mar. 1, 2019, arxiv.org, arXiv1809.10732v2, 7 pages.
Djuric et al., "Short-Term Motion Prediction of Traffic Actors for Autonomous Driving Using Deep Convolutional Networks", 2018, arxiv.org, arxiv:1808.05819, 10 pages.
Jain et al., "Discrete Residual Flow for Probabilistic Pedestrian Behavior Prediction", 3rd Conference on Robot Learning, 2019, Osaka Japan, 13 pages.
Lee et al., "Desire: Distant Future Prediction in Dynamic Scenes with Interacting Agents", Proceedings of the IEEE Conference Center on Computer Vision and Pattern Recognition, 2017, pp. 336-345.
Lefevre et al., "A Survey on Motion Prediction and Risk Assessment for Intelligent Vehicles", 2014, ROBOMECH Journal, vol. 1, No. 1, 14 pages.
Luo et al., "Fast and Furious: Real Time End-to-End 3D Detection, Tracking and Motion Forecasting with a Single Convolutional Net", Proceedings of the IEEE Conference on Computer Vision and Pattern Recognition, 2018, pp. 3569-3577.
Reinhart et al., "Precog: Prediction Conditioned on Goals in Visual Multi-Agent Settings", Proceedings of the IEEE International Conference on Computer Vision, 2019, pp. 2821-2830.
Rupprecht et al., "Learning in an Uncertain World: Representing Ambiguity through Multiple Hypotheses" Proceedings of the IEEE International Conference on Computer Vision, 2017, pp. 3591-3600.
Schulz et al., "Interaction-Aware Probabilistic Behavior Prediction in Urban Environments", Aug. 28, 2018, arxiv.org, arxiv:1804.10467v2, 8 pages.
Van der Heiden et al., "Safecritic: Collision-Aware Trajectory Prediction", 2019, arxiv.org, arxiv:1910.06673v1, 8 pages.
Walker et al., "An Uncertain Future: Forecasting from Static Images Using Variational Autoencoders", European Conference on Computer Vision, Springer 2016, pp. 835-851.

* cited by examiner

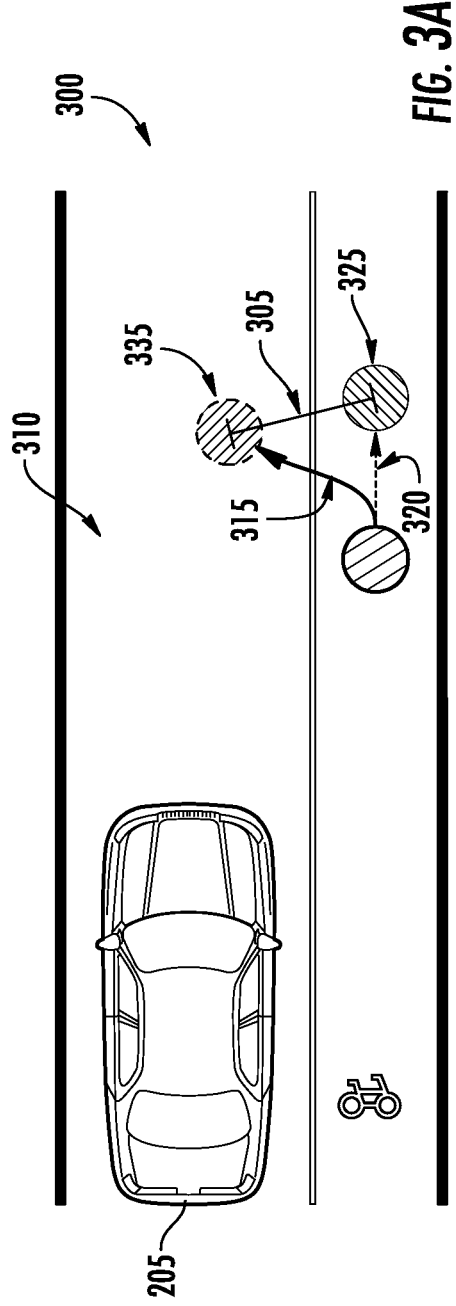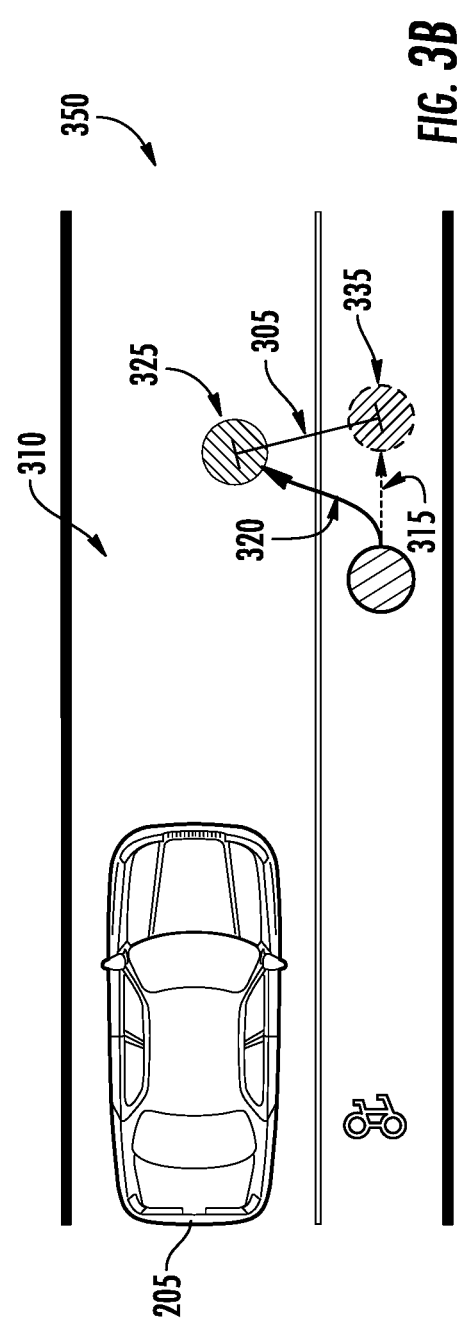

METRICS FOR EVALUATING AUTONOMOUS VEHICLE PERFORMANCE

RELATED APPLICATION

The present application is based on and claims the benefit of U.S. Provisional Patent Application No. 63/086,306 having a filing date of Oct. 1, 2020, which is incorporated by reference herein.

BACKGROUND

The present disclosure relates generally to vehicle perception, forecasting, and motion planning. In particular, the present disclosure relates to machine-learned model evaluation techniques that can be used to evaluate the performance of autonomous vehicle systems. Robots, including autonomous vehicles, can receive data that is used to perceive an environment through which the robot can travel. Robots can rely on machine-learned models to detect and predict the movement of objects within an environment. The effective operation of a robot can depend on accurate object detection and prediction provided by the machine-learned models. Various training techniques can be applied to evaluate the performance of such machine-learned models.

SUMMARY

Aspects and advantages of embodiments of the present disclosure will be set forth in part in the following description, or may be learned from the description, or may be learned through practice of the embodiments. The present disclosure describes the generation of improved performance metrics for evaluating the performance of robotic platform systems. A robotic platform (or one or more sensors thereof) can leverage machine-learning algorithms to identify objects within an environment, predict the future movements of dynamic objects, and generate trajectories to navigate around the detected or predicted position of the objects. The machine-learning algorithms are typically evaluated over metrics that are ignorant to a number of features significant to navigational tasks such as autonomous driving. The present disclosure provides for performance metrics for evaluating the performance of machine-learning algorithms that are specifically correlated to navigational tasks such as autonomous driving. The performance metrics include at least two complementary metrics that evaluate all aspects (e.g., a predicted object's position, orientation, shape, uncertainty, etc.) of a machine-learning object prediction algorithm's output. The at least two complementary performance metrics include at least one avoidance metric and at least one availability metric. The avoidance metric evaluates how well a prediction output enables the robotic platform to successfully avoid objects while navigating an environment. The availability metric evaluates how well the prediction output enables the robotic platform to identify "available maneuvers" that are not obstructed by an object in the environment.

The performance metrics can be used individually or in combination to evaluate the accuracy of a prediction output that includes predictions for object trajectories over a testing time frame within a testing environment (e.g., a real-world environment or a simulated environment). The performance metrics are specifically tailored to autonomous navigation by being determined relative to a set of vehicle trajectories covering all probable vehicle maneuvers over the testing time frame within the testing environment. A vehicle trajectory is represented by a number of footprints (e.g., a plurality of cells defining a fixed area occupied by an autonomous vehicle) spaced within a spatio-temporal occupancy grid over a number of corresponding time steps in the testing time frame. The metrics are determined by comparing the prediction output to each of the number of vehicle trajectories to determine whether a predicted object trajectory (e.g., identified based on the prediction output) overlaps a vehicle footprint (e.g., occupies a cell of the vehicle footprint or any vehicle footprint preceding the vehicle footprint) at any time during the testing time period. An overlap between a vehicle's footprint and a predicted object trajectory can signify that the prediction output will prevent the vehicle from reaching the overlapped footprint (e.g., to avoid the predicted object). The avoidance metric quantifies whether a vehicle footprint is overlapped before a vehicle trajectory reaches a testing object (e.g., therefore stopping the vehicle before an actual/simulated interference with the testing object). The availability metric quantifies a percentage of a vehicle trajectory's available footprints (e.g., footprints that occur before the vehicle trajectory reaches an exposed testing object) that are considered unavailable due to an overlapping predicted object trajectory (e.g., therefore stopping the vehicle earlier than necessary to avoid a collision with the testing object).

Aspects of the present disclosure can provide a number of technical improvements to simulation, robotics, and computer prediction technology. The improved machine-learned performance metrics described herein can leverage knowledge of an autonomous vehicle's potential maneuvers to specifically evaluate a prediction's impact to autonomous navigation. In this way, the systems and methods of the present disclosure provide an improved approach for evaluating prediction systems that is specifically tailored to autonomous navigation. This, in turn, can increase the performance of machine-learning models by providing an effective measure of the safety and comfort afforded by prediction systems before and/or during autonomous navigation.

The systems and methods described herein can accumulate and utilize newly available information such as sample autonomous vehicle trajectories and improved performance metrics to provide practical improvements to simulation, robotic, and prediction technology. The improved performance metrics replace previous evaluation techniques lacking an awareness of the autonomous vehicle or potential maneuvers thereof. Moreover, the performance metrics described herein do not require ground-truth association, thereby enabling the performance metrics to account for false-positives and false-negatives ignored by previous evaluation techniques in the event that the detection errors lack a ground-truth match. Specifically, the performance metrics described herein provide an improvement over common evaluation techniques such as displacement error by marking prediction failures that lead to unsafe or uncomfortable events in a simulation or in the real-world. In this manner, the systems and methods described herein can increase the speed and efficiency of detecting prediction errors and, in some cases, speed up the iteration of prediction model development. This, in turn, improves the functioning of simulation, robotics, and computer prediction technologies by increasing the relevance of prediction evaluation metrics to autonomous driving tasks. Ultimately, the techniques disclosed herein result in more accurate, robust, and efficient evaluation techniques, thereby improving training techniques and on road performance for a vast array of robotic, prediction, or autonomous vehicle technologies.

As an example, in an aspect, the present disclosure provides a computing system including one or more processors and one or more computer-readable mediums storing instructions that when executed by the one or more processors cause the computing system to perform operations. The operations include receiving data indicative of a trajectory of an autonomous vehicle including a plurality of footprints of the autonomous vehicle at a corresponding plurality of time steps of a time frame. The operations include receiving testing object data indicative of an object in an environment of the autonomous vehicle and prediction data indicative of one or more predicted object trajectories in the environment of the autonomous vehicle. The operations include outputting a performance metric for a particular footprint of the plurality of footprints of the autonomous vehicle based at least in part on the trajectory of the autonomous vehicle, the testing object data, and the prediction data. The performance metric quantifies a probability that (i) the object in the environment of the autonomous vehicle occupies at least a portion of the particular footprint at a particular time step corresponding to the particular footprint and (ii) the particular footprint is not blocked by at least one of the one or more predicted object trajectories at or before the particular time step.

In some implementations, the operations include determining a probability that the particular footprint is not blocked by the at least one predicted object trajectory at or before the particular time step. Determining the probability that the particular footprint is not blocked by the at least one predicted object trajectory at or before the particular time step includes determining a probability that the one or more predicted object trajectories do not overlap the particular footprint at the particular time step and a probability that the one or more predicted object trajectories do not overlap at least one preceding footprint at one or more time steps preceding the particular time step.

In some implementations, the probability that (i) the object in the environment of the autonomous vehicle occupies at least a portion of the particular footprint at a particular time step corresponding to the particular footprint and (ii) the particular footprint is not blocked by at least one of the one or more predicted object trajectories at or before the particular time step is conditioned on a probability of the autonomous vehicle reaching the particular footprint during execution of the trajectory of the autonomous vehicle.

In some implementations, the probability that (i) the object in the environment of the autonomous vehicle occupies at least a portion of the particular footprint at a particular time step corresponding to the particular footprint and (ii) the particular footprint is not blocked by at least one of the one or more predicted object trajectories at or before the particular time step is conditioned on a probability of the particular footprint not being blocked by another object at a time step preceding the particular time step.

In some implementations, a footprint of the autonomous vehicle for a corresponding time step of the plurality of time steps includes a plurality of vehicle cells within a spatio-temporal occupancy grid. For example, the spatio-temporal occupancy grid includes a plurality of cells representative of an environment, and the plurality of vehicle cells represent a region of fixed area within the environment corresponding to a body of the autonomous vehicle at the corresponding time step. In some aspects, the spatio-temporal occupancy grid is defined by path-relative coordinates adapted to an intended path of the autonomous vehicle. The intended path of the autonomous vehicle is based at least in part on a road geometry associated with the environment. In some implementations, receiving the data indicative of the trajectory of the autonomous vehicle includes generating the data indicative of the trajectory of the autonomous vehicle based at least in part on the intended path of the autonomous vehicle, determining a trajectory probability for the trajectory, and determining the probability that the particular footprint is reached by the autonomous vehicle based at least in part on the trajectory probability for the trajectory. The trajectory probability is indicative of a probability that the autonomous vehicle reaches at least one of the plurality of footprints of the autonomous vehicle.

In some implementations, outputting the performance metric for the prediction data includes determining a footprint occupancy probability for the footprint of the autonomous vehicle based at least in part on the prediction data, and determining the performance metric based at least in part on the footprint occupancy probability for the footprint of the autonomous vehicle. The footprint occupancy probability is indicative of a probability that at least one of the plurality of vehicle cells is overlapped by a predicted object corresponding to the at least one of the one or more predicted object trajectories.

In some aspects, the prediction data includes a predicted cell occupancy probability for at least one cell of the plurality of cells of the spatio-temporal occupancy grid for the corresponding time step of the plurality of time steps. The predicted cell occupancy probability is indicative of whether the at least one cell of the spatio-temporal occupancy grid is occupied by a predicted object at the corresponding time step. Determining the footprint occupancy probability for the footprint of the autonomous vehicle based at least in part on the prediction data includes determining the footprint occupancy probability for the footprint of the autonomous vehicle based at least in part on the predicted cell occupancy probability for the at least one cell of the spatio-temporal occupancy grid at the corresponding time step.

Is some aspects, the operations include determining a predicted cell occupancy probability for at least one of the plurality of cells of the spatio-temporal occupancy grid for the corresponding time step of the plurality of time steps based at least in part on the prediction data. The predicted cell occupancy probability is indicative of whether the at least one cell of the spatio-temporal occupancy grid is occupied by a predicted object at the corresponding time step. The operations include determining the footprint occupancy probability for the footprint of the autonomous vehicle based at least in part on the predicted cell occupancy probability for the at least one cell of the spatio-temporal occupancy grid at the corresponding time step.

In some implementations, the prediction data is received from a machine-learning prediction model. The performance metric evaluates an effect of the machine-learning prediction model on one or more motion planning operations of the autonomous vehicle. The machine-learning prediction model is trained based at least in part on the performance metrics. The operations include receiving data indicative of the trajectory of the autonomous vehicle from a machine-learning motion planning model configured to perform the one or more motion planning operations for the autonomous vehicle. The data indicative of the trajectory includes a trajectory probability associated with the plurality of footprints of the autonomous vehicle. The probability that the particular footprint is reached by the autonomous vehicle is based at least in part on the trajectory probability associated with the plurality of footprints of the autonomous vehicle as received from the machine-learning motion planning model.

In some implementations, the operations include providing one or more vehicle instructions for implementation of the trajectory based at least in part on the performance metric.

In another aspect, the present disclosure provides a computer-implemented method. The method includes receiving data indicative of a trajectory of an autonomous vehicle including a plurality of footprints of the autonomous vehicle at a corresponding plurality of time steps of a time frame. The method includes receiving testing object data indicative of an object in an environment of the autonomous vehicle and prediction data indicative of one or more predicted object trajectories in the environment of the autonomous vehicle. The method includes outputting a performance metric for a particular footprint of the plurality of footprints of the autonomous vehicle based at least in part on the trajectory of the autonomous vehicle, the testing object data, and the prediction data. The performance metric quantifies a probability that (i) the object in the environment of the autonomous vehicle occupies at least a portion of the particular footprint at a particular time step corresponding to the particular footprint and (ii) the particular footprint is not blocked by at least one of the one or more predicted object trajectories at or before the particular time step.

In some implementations, a footprint of the autonomous vehicle for a corresponding time step of the plurality of time steps includes a plurality of vehicle cells within a spatio-temporal occupancy grid. The spatio-temporal occupancy grid includes a plurality of cells representative of an environment, and the plurality of vehicle cells represent a region of fixed area within the environment corresponding to a body of the autonomous vehicle at the corresponding time step.

In some implementations, outputting the performance metric includes determining a footprint occupancy probability for the footprint of the autonomous vehicle based at least in part on the prediction data, and determining the performance metric based at least in part on the footprint occupancy probability for the footprint of the autonomous vehicle. The footprint occupancy probability is indicative of a probability that at least one of the plurality of vehicle cells is overlapped by a predicted object corresponding to the at least one of the one or more predicted object trajectories. The prediction data includes a predicted cell occupancy probability for at least one cell of the plurality of cells of the spatio-temporal occupancy grid for the corresponding time step of the plurality of time steps. The predicted cell occupancy probability is indicative of whether the at least one cell of the spatio-temporal occupancy grid is occupied by a predicted object at the corresponding time step. Determining the footprint occupancy probability for the footprint of the autonomous vehicle based at least in part on the prediction data includes determining the footprint occupancy probability for the footprint of the autonomous vehicle based at least in part on the predicted cell occupancy probability for the at least one cell of the spatio-temporal occupancy grid at the corresponding time step.

In some implementations, the prediction data is received from a machine-learning prediction model. The performance metric evaluates an effect of the machine-learning prediction model on one or more motion planning operations of the autonomous vehicle. The machine-learning prediction model is trained based at least in part on the performance metrics.

In yet another aspect, the present disclosure provides one or more tangible, non-transitory, computer readable media that store instructions that when executed by one or more processors cause the one or more processors to perform operations. The operations include receiving data indicative of a trajectory of an autonomous vehicle including a plurality of footprints of the autonomous vehicle at a corresponding plurality of time steps of a time frame. The operations include receiving testing object data indicative of an object in an environment of the autonomous vehicle and prediction data indicative of one or more predicted object trajectories in the environment of the autonomous vehicle. The operations include outputting a performance metric for a particular footprint of the plurality of footprints of the autonomous vehicle based at least in part on the trajectory of the autonomous vehicle, the testing object data, and the prediction data. The performance metric quantifies a probability that (i) the object in the environment of the autonomous vehicle occupies at least a portion of the particular footprint at a particular time step corresponding to the particular footprint and (ii) the particular footprint is not blocked by at least one of the one or more predicted object trajectories at or before the particular time step.

As an example, in an aspect, the present disclosure provides a computing system including one or more processors and one or more computer-readable mediums storing instructions that when executed by the one or more processors cause the computing system to perform operations. The operations include receiving data indicative of a trajectory of an autonomous vehicle including a plurality of footprints of the autonomous vehicle at a corresponding plurality of time steps of a time frame. The operations include receiving testing object data indicative of an object in an environment of the autonomous vehicle and prediction data indicative of one or more predicted object trajectories in the environment of the autonomous vehicle. The operations include outputting a performance metric for a particular footprint of the plurality of footprints of the autonomous vehicle based at least in part on the trajectory of the autonomous vehicle, the testing object data, and the prediction data. The performance metric quantifies a probability that (i) the object in the environment of the autonomous vehicle does not occupy at least a portion of the particular footprint at a particular time step corresponding to the particular footprint, and (ii) the particular footprint is blocked by at least one of the one or more predicted object trajectories at or before the particular time step.

In some implementations, the operations include determining, based on the trajectory of the autonomous vehicle and the prediction data, an overlap between a respective vehicle footprint and the at least one of the one or more predicted object trajectories. The operations include determining, based at least in part on the respective vehicle footprint, one or more obstructed footprints of the one or more available footprints of the autonomous vehicle. The one or more obstructed footprints include the respective vehicle footprint and subsequent vehicle footprints of the plurality of vehicle footprints occurring after the respective vehicle footprint. Outputting the performance metric includes determining the performance metric for the prediction data based at least in part on the one or more obstructed footprints of the one or more available vehicle footprints.

In some implementations, the operations include determining a probability that the particular footprint is blocked by the at least one predicted object trajectory at or before the particular time step. Determining the probability that the particular footprint is blocked by the at least one predicted object trajectory at or before the particular time step includes determining a probability that the one or more predicted object trajectories overlap the particular footprint at the particular time step and determining a probability that the one or more predicted object trajectories overlap at least one preceding footprint at one or more time steps preceding the particular time step.

In some implementations, the probability that (i) the object in the environment of the autonomous vehicle does not occupy at least a portion of the particular footprint at a particular time step corresponding to the particular footprint, and (ii) the particular footprint is blocked by at least one of the one or more predicted object trajectories at or before the particular time step is conditioned on a probability of the autonomous vehicle reaching the particular footprint during execution of the trajectory of the autonomous vehicle.

In some implementations, the probability that (i) the object in the environment of the autonomous vehicle does not occupy at least a portion of the particular footprint at a particular time step corresponding to the particular footprint, and (ii) the particular footprint is blocked by at least one of the one or more predicted object trajectories at or before the particular time step is conditioned on a probability of the particular footprint not being blocked by another object at a time step preceding the particular time step.

In some implementations, a footprint of the autonomous vehicle for a corresponding time step of the plurality of time steps includes a plurality of vehicle cells within a spatio-temporal occupancy grid. For example, the spatio-temporal occupancy grid includes a plurality of cells representative of an environment, and the plurality of vehicle cells represent a region of fixed area within the environment corresponding to a body of the autonomous vehicle at the corresponding time step. The spatio-temporal occupancy grid is defined by path-relative coordinates adapted to an intended path of the autonomous vehicle. The intended path of the autonomous vehicle is based at least in part on a road geometry associated with the environment. In some implementations, receiving the data indicative of the trajectory of the autonomous vehicle includes generating the data indicative of the trajectory of the autonomous vehicle based at least in part on the intended path of the autonomous vehicle, determining a trajectory probability for the trajectory, and determining a probability that the particular footprint is reached by the autonomous vehicle based at least in part on the trajectory probability for the trajectory. The trajectory probability is indicative of a probability that the autonomous vehicle reaches at least one of the plurality of footprints of the autonomous vehicle.

In some implementations, outputting the performance metric for the prediction data includes determining a footprint occupancy probability for the footprint of the autonomous vehicle based at least in part on the prediction data, and determining the performance metric based at least in part on the footprint occupancy probability for the footprint of the autonomous vehicle. The footprint occupancy probability is indicative of a probability that at least one of the plurality of vehicle cells is overlapped by a predicted object corresponding to the at least one of the one or more predicted object trajectories.

In some aspects, the prediction data includes a predicted cell occupancy probability for at least one cell of the plurality of cells of the spatio-temporal occupancy grid for the corresponding time step of the plurality of time steps. The predicted cell occupancy probability is indicative of whether the at least one cell of the spatio-temporal occupancy grid is occupied by a predicted object at the corresponding time step. Determining the footprint occupancy probability for the footprint of the autonomous vehicle based at least in part on the prediction data includes determining the footprint occupancy probability for the footprint of the autonomous vehicle based at least in part on the predicted cell occupancy probability for the at least one cell of the spatio-temporal occupancy grid at the corresponding time step.

Is some aspects, the operations include determining a predicted cell occupancy probability for at least one of the plurality of cells of the spatio-temporal occupancy grid for the corresponding time step of the plurality of time steps based at least in part on the prediction data. The predicted cell occupancy probability is indicative of whether the at least one cell of the spatio-temporal occupancy grid is occupied by a predicted object at the corresponding time step. The operations include determining the footprint occupancy probability for the footprint of the autonomous vehicle based at least in part on the predicted cell occupancy probability for the at least one cell of the spatio-temporal occupancy grid at the corresponding time step.

In some implementations, the prediction data is received from a machine-learning prediction model. The performance metric evaluates an effect of the machine-learning prediction model on one or more motion planning operations of the autonomous vehicle. The machine-learning prediction model is trained based at least in part on the performance metrics. The operations include receiving data indicative of the trajectory of the autonomous vehicle from a machine-learning motion planning model configured to perform the one or more motion planning operations for the autonomous vehicle. The data indicative of the trajectory includes a trajectory probability associated with the plurality of footprints of the autonomous vehicle. The probability that the particular footprint is reached by the autonomous vehicle is based at least in part on the trajectory probability associated with the plurality of footprints of the autonomous vehicle as received from the machine-learning motion planning model.

In some implementations, the operations include providing one or more vehicle instructions for implementation of the trajectory based at least in part on the performance metric.

In another aspect, the present disclosure provides a computer-implemented method. The method includes receiving data indicative of a trajectory of an autonomous vehicle including a plurality of footprints of the autonomous vehicle at a corresponding plurality of time steps of a time frame. The method includes receiving testing object data indicative of an object in an environment of the autonomous vehicle and prediction data indicative of one or more predicted object trajectories in the environment of the autonomous vehicle. The method includes outputting a performance metric for a particular footprint of the plurality of footprints of the autonomous vehicle based at least in part on the trajectory of the autonomous vehicle, the testing object data, and the prediction data. The performance metric quantifies a probability that (i) the object in the environment of the autonomous vehicle does not occupy at least a portion of the particular footprint at a particular time step corresponding to the particular footprint, and (ii) the particular footprint is blocked by at least one of the one or more predicted object trajectories at or before the particular time step.

In some implementations, a footprint of the autonomous vehicle for a corresponding time step of the plurality of time steps includes a plurality of vehicle cells within a spatio-temporal occupancy grid. The spatio-temporal occupancy grid includes a plurality of cells representative of an environment, and the plurality of vehicle cells represent a region of fixed area within the environment corresponding to a body of the autonomous vehicle at the corresponding time step.

In some implementations, outputting the performance metric includes determining a footprint occupancy probability for the footprint of the autonomous vehicle based at least in part on the prediction data, and determining the performance metric based at least in part on the footprint occupancy probability for the footprint of the autonomous vehicle. The footprint occupancy probability is indicative of a probability that at least one of the plurality of vehicle cells is overlapped by a predicted object corresponding to the at least one of the one or more predicted object trajectories. The prediction data includes a predicted cell occupancy probability for at least one cell of the plurality of cells of the spatio-temporal occupancy grid for the corresponding time step of the plurality of time steps. The predicted cell occupancy probability is indicative of whether the at least one cell of the spatio-temporal occupancy grid is occupied by a predicted object at the corresponding time step. Determining the footprint occupancy probability for the footprint of the autonomous vehicle based at least in part on the prediction data includes determining the footprint occupancy probability for the footprint of the autonomous vehicle based at least in part on the predicted cell occupancy probability for the at least one cell of the spatio-temporal occupancy grid at the corresponding time step.

In some implementations, the prediction data is received from a machine-learning prediction model. The performance metric evaluates an effect of the machine-learning prediction model on one or more motion planning operations of the autonomous vehicle. The machine-learning prediction model is trained based at least in part on the performance metrics.

In yet another aspect, the present disclosure provides one or more tangible, non-transitory, computer readable media that store instructions that when executed by one or more processors cause the one or more processors to perform operations. The operations include receiving data indicative of a trajectory of an autonomous vehicle including a plurality of footprints of the autonomous vehicle at a corresponding plurality of time steps of a time frame. The operations includes receiving testing object data indicative of an object in an environment of the autonomous vehicle and prediction data indicative of one or more predicted object trajectories in the environment of the autonomous vehicle. The operations include outputting a performance metric for a particular footprint of the plurality of footprints of the autonomous vehicle based at least in part on the trajectory of the autonomous vehicle, the testing object data, and the prediction data. The performance metric quantifies a probability that (i) the object in the object in the environment of the autonomous vehicle does not occupy at least a portion of the particular footprint at a particular time step corresponding to the particular footprint, and (ii) the particular footprint is blocked by at least one of the one or more predicted object trajectories at or before the particular time step.

Other example aspects of the present disclosure are directed to other systems, methods, vehicles, apparatuses, tangible non-transitory computer-readable media, and devices for generating data (e.g., scene representations, simulation data, etc.), training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIGS. 3A-B are examples of previous performance metrics for machine-learning evaluation techniques, according to some implementations of the present disclosure;

DETAILED DESCRIPTION

The following describes the technology of this disclosure within the context of an autonomous vehicle for example purposes only. As described herein, the technology described herein is not limited to an autonomous vehicle and can be implemented within other robotic and computing systems.

Figure 1:
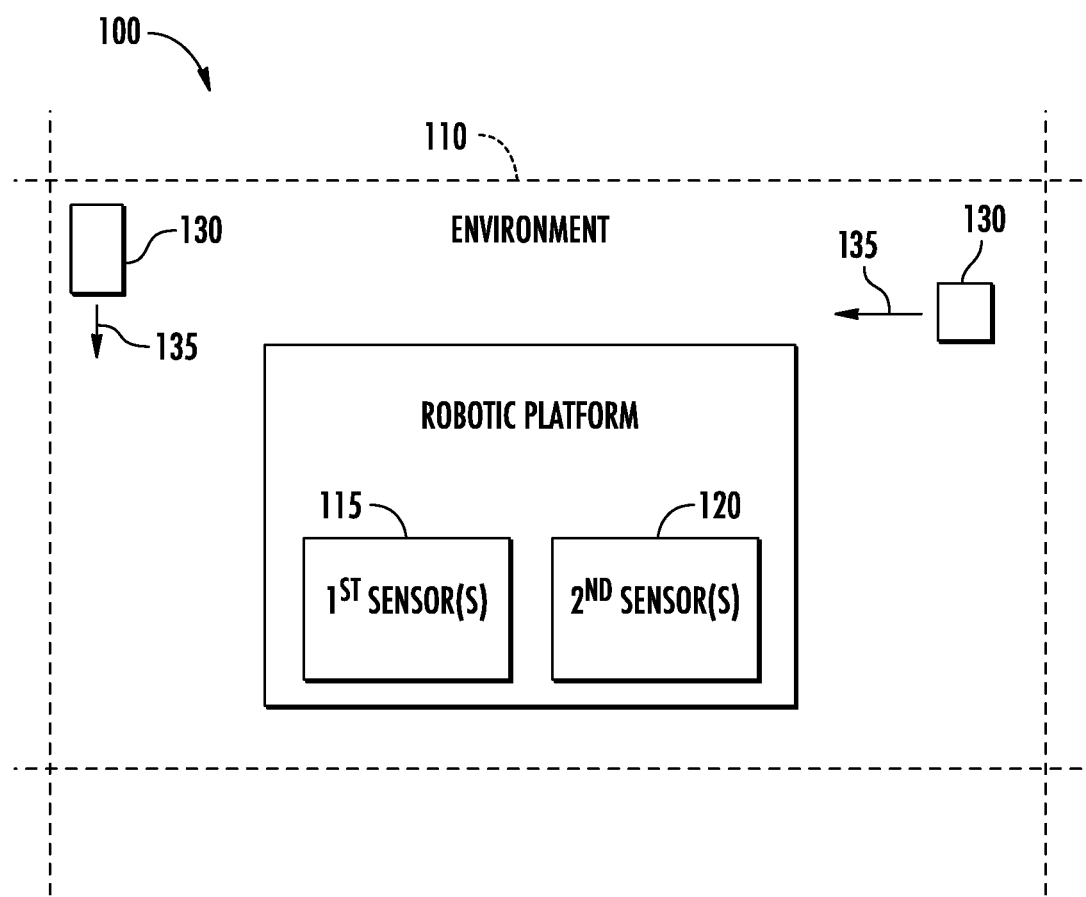
FIG. 1 is a block diagram of an operational scenario, according to some implementations of the present disclosure.

With reference now to FIGS. 1-11, example embodiments of the present disclosure will be discussed in further detail. FIG. 1 is a block diagram of an operational scenario 100, according to some implementations of the present disclosure. The operational scenario 100 includes a robotic platform 105 and an environment 110. The environment 110 can be external to the robotic platform 105. The robotic platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.). The environment 110 can include a real-world environment or a simulated environment. A simulated environment, for example, can include a generated environment modelled after one or more real-world scenes and/or scenarios. The operation of the robotic platform 105 can be simulated within a simulated environment by providing data indicative of the simulated environment (e.g., historical data associated with a corresponding real-world scene, data generated based on one or more heuristics, etc.) to one or more systems of the robotic platform 105.

The environment 110 can include one or more dynamic object(s) 130 (e.g., simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. The robotic platform 105 can include one or more sensor(s) 115, 120. The one or more sensors 115, 120 can be configured to generate or store data descriptive of the environment 110 (e.g., one or more static or dynamic object(s) 130 therein). The sensor(s) 115, 120 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The robotic platform 105 can include any type of platform configured to operate within the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
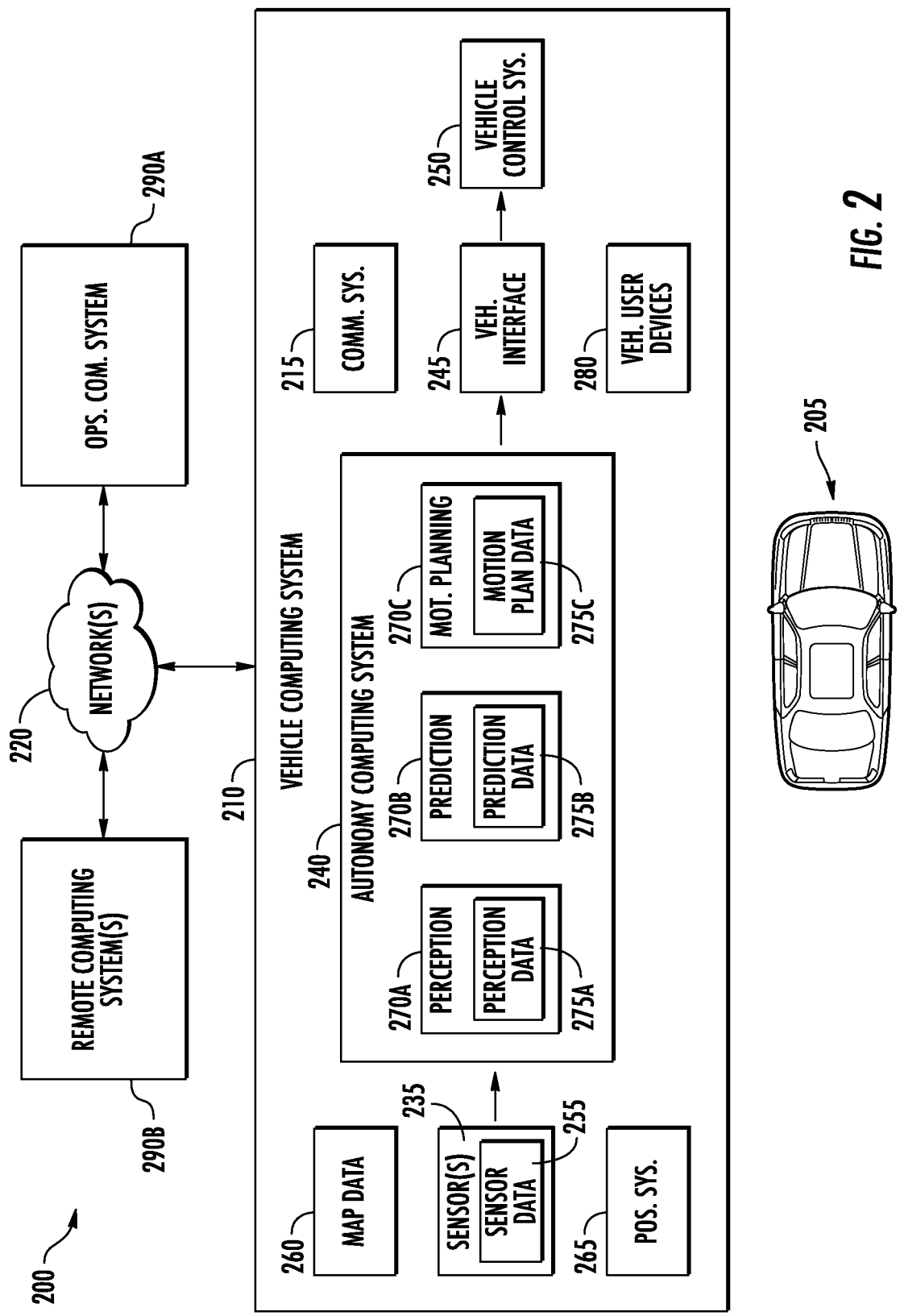
FIG. 2 is a block diagram of a system, according to some implementations of the present disclosure.

FIG. 2 is a block diagram of a system 200, according to some implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. Generally, the vehicle computing system 210 can obtain sensor data 255 from a sensor system 235 (e.g., sensor(s) 115, 120 of FIG. 1) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, vertical take-off and lift (VTOL) aircraft, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 or also omitted from remote control of the vehicle 205. In some implementations, a human operator can be included in the vehicle 205.

The vehicle 205 can be configured to operate in a plurality of operating modes. The vehicle 205 can be configured to operate in a fully autonomous (e.g., self-driving) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system 290B (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users to coordinate a vehicle service provided by the vehicle 205. To do so, the operations computing system 290A can communicate with the one or more remote computing system(s) 290B or the vehicle 205 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for predicting object trajectories and evaluating the accuracy of those predictions using a variety of performance metrics.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain sensor data (e.g., a portion of sensor data 255) indicative of one or more dynamic objects within an environment of the vehicle 205. As described herein with reference to the remaining figures, the sensor data 255 can be collected in real-time while the vehicle 205 is operating in a real-world environment or the sensor data 255 can be fed to the sensor(s) 235 to simulate a simulated environment. The sensor data 255, for example, can include simulation data for evaluating one or more machine-learned models or algorithms of the vehicle computing system 210, etc.

More generally, the sensor(s) 235 can be configured to acquire sensor data 255. The sensor(s) 235 can be external sensors configured to acquire external sensor data. This can include sensor data associated with the surrounding environment (e.g., in a real-world or simulated environment) of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205. The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, or below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing system(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curbs); the location and direction of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indication of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high definition map data. In some implementations, the map data 260 can include sparse map data indicative of a limited number of environmental features (e.g., lane boundaries, etc.). In some implementations, the map data 260 can be limited to geographic area(s) or operating domains in which the vehicle 205 (or autonomous vehicles generally) may travel (e.g., due to legal/regulatory constraints, autonomy capabilities, or other factors).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the portion of autonomy computing system 240 dedicated to prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points, footprints, etc. In some implementations, the prediction data 275B can be indicative of the speed or acceleration at which the respective object is predicted to travel along its associated predicted motion trajectory. The vehicle computing system 210 can utilize one or more algorithms or machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The portion of autonomy computing system 240 dedicated to motion planning function 270C can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be trained through one or more machine-learned techniques. For instance, the machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system (e.g., the operations computing system 290A, etc.) over training data stored in a training database. The training data can include simulation data indicative of a plurality of environments and/or testing objects/object trajectories at one or more times. The simulation data can be indicative of a plurality of dynamic objects within the environments. In some implementations, the training data can include a plurality of environments previously recorded by the vehicle 205. For instance, the training data can be indicative of a plurality of dynamic objects previously observed or identified by the vehicle 205.

The performance of the machine-learned model(s) can be evaluated (and/or trained) using one or more performance metrics. For example, the accuracy of a machine-learning prediction model can be evaluated by one or more performance metrics quantifying a distance between a ground truth object and the location of a predicted object. For example, FIGS. 3A-B are examples of different machine-learning evaluation techniques, according to some implementations of the present disclosure. Common metrics for evaluating object motion prediction can include average displacement error (ADE) and final displacement error (FDE). These metrics, however, do not correlate well with the road performance of a vehicle 205. For example, such metrics can be generally reflective of a prediction's accuracy (e.g., a displacement error 305 between a testing object 335 and a predicted object 325) but may omit features that can significantly impact the performance of the vehicle 205 on road 310 such as, for example, the location of the testing object 335 in relation to an autonomous vehicle trajectory.

By way of example, FIGS. 3A and 3B show two scenarios 300, 350 with identical displacement error 305 but different results.

FIG. 3A is an example scenario 300 with a testing object 335 (e.g., real-world object, simulated object, etc.) that follows a real trajectory 315 to travel to a location on the road 310 within the trajectory of the vehicle 205. In addition, the scenario 300 includes a predicted object 325 that is predicted to follow the predicted object trajectory 320 to travel to a location off of the road 310 outside of the trajectory of the vehicle 205. FIG. 3B is an example scenario 350 in which the predicted object 325 is predicted to follow the predicted object trajectory 320 to travel to the location on the road 310 within the trajectory of the vehicle 205 and the testing object 335 actually follows the real trajectory 315 to travel to the location off of the road 310 outside of the trajectory of the vehicle 205. Each scenario will have the same displacement error 305, even though scenario 300 results in a potential collision with the testing object 335 because the predicted object 325 fails to block the vehicle's path, while scenario 350 results in an early stopping action because the predicted object 325 causes the vehicle 205 to stop unnecessarily. Therefore, the same displacement error 305 can cause two equally weighted errors when one of the errors is significantly more severe than another. Truly evaluating a prediction's impact on on-road behavior usually entails full system simulation and/or track testing. However, both are expensive and require a fully-capable autonomous system.

To help improve the performance of a robotic platform, such as an autonomous vehicle of FIG. 2, the technology of the present disclosure can leverage performance metrics tailored to autonomous navigation tasks to evaluate the performance of machine-learning models utilized to perform the autonomy tasks. Using the technology of the present disclosure, the machine-learning models can be more closely evaluated based on features specific to autonomous motion planning and/or object prediction. For example, the performance metrics described herein can include an avoidance metric and an availability metric. The avoidance metric quantifies whether a vehicle's space is overlapped by a predicted object trajectory before a vehicle trajectory reaches a testing object (e.g., therefore stopping the vehicle before an actual/simulated collision with the testing object). The availability metric quantifies a percentage of the vehicle's available space (e.g., regions before a vehicle trajectory reaches the testing object) that are considered unavailable due to an overlapping predicted object trajectory (e.g., therefore stopping the vehicle earlier than necessary to avoid a collision with the testing object). By taking account of the vehicle's potential trajectories during the evaluation process, the evaluation metrics can be correlated with successful on road behavior rather than the arbitrary accuracy of a prediction.

Figure 4:
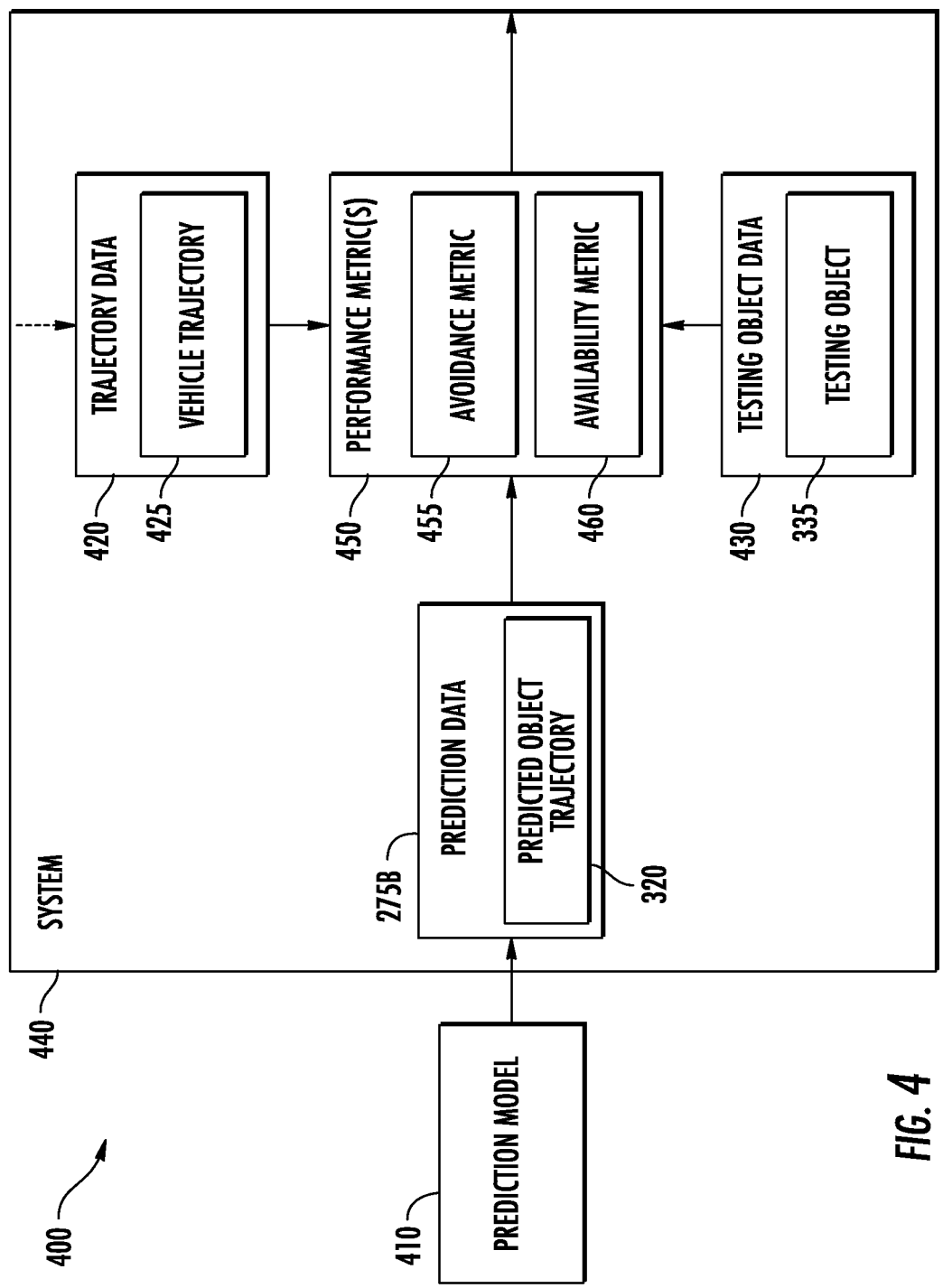
FIG. 4 is a data flow diagram for evaluating autonomy models, according to some implementations of the present disclosure.

FIG. 4 is a data flow diagram 400 for evaluating autonomy models, according to some implementations of the present disclosure. The data flow diagram 400 includes a system 440 configured to output performance metrics 450 that evaluate the performance of an object prediction model 410 based on prediction data 275B output by the object prediction model 410, trajectory data 420 for an autonomous vehicle (e.g., vehicle 205), and testing object data 430. The system 440 can include any of the system(s) (e.g., robotic platform 105, vehicle 205, vehicle computing system 210, remote computing system 290B, operations computing system 290A, etc.) described herein such as, for example, with reference to FIGS. 1, 2, etc. By evaluating the performance of the object prediction model 410 with respect to the trajectory data 420, the performance metrics 450 can be better correlated with the on-road behavior of an autonomous vehicle.

The performance metrics 450 can be determined in real-time while the autonomous vehicle is operating (e.g., in a redundant manner to ensure safe operation of the autonomous vehicle) on a roadway (e.g., a test track, etc.). By way of example, the performance metrics 450 can be determined based on testing object data 430 gathered through one or more redundant systems onboard an autonomous vehicle and/or one or more supervisory systems onboard and/or otherwise in communication with the autonomous vehicle. In such a case, the system 440 can provide one or more vehicle instructions for implementation of a vehicle trajectory 425 based at least in part on the performance metrics 450. In addition, or alternatively, the performance metrics 450 can be determined for the object prediction model 410 remote from an autonomous vehicle and/or while the autonomous vehicle is not operating in the real-world. For example, the performance metrics 450 can be determined during a training process of the object prediction model 410. For instance, the object prediction model 410 can be trained based at least in part on the performance metrics 450. By way of example, the object prediction model 410 can be trained to optimize the performance metrics 450.

As described in further detail herein, the performance metrics 450 can include an avoidance metric 455 and/or an availability metric 460. The avoidance metric 455 can evaluate a risk associated with the prediction data 275B with respect to the trajectory data 420. The risk of the prediction data 275B may be related to recall. The prediction data 275B, for example, can forecast an object's future motion (e.g., a predicted object trajectory 320) and predict spaces of an environment occupied by the object at future points in time. Recall can represent a portion (e.g., a percentage, etc.) of an actual object's actual future occupied space that is accounted for by the prediction data 275B. A low avoidance metric 455 (e.g., low recall) can suggest that the prediction data 275B does not enable an autonomous vehicle to correctly anticipate the actual future space occupied by the actual object (e.g., a simulated object or real-world object), thereby impacting roadway safety by lowering the vehicle's ability to avoid the actual object while navigating a roadway.

The availability metric 460 can evaluate the comfort of the prediction data 275B with respect to the trajectory data 420. The comfort of the prediction data 275B may be related to precision. Precision can represent a portion (e.g., a fraction) of the space predicted to be occupied by a predicted object that does not actually end up as occupied by an actual object. A low availability metric 460 (e.g., low precision) for the prediction data 275B can suggest that the object prediction model 410 is over-predicting, thereby impacting roadway comfort by unnecessarily increasing the vehicle's stopping/avoidance maneuvers and, in the extreme case, preventing the vehicle from moving.

The prediction data 275B can be received from the object prediction model 410 and the performance metrics 450 can evaluate an effect of the object prediction model 410 on one or more motion planning operations of the autonomous vehicle. In this way, the performance metrics 450 can directly connect the evaluation of the object prediction model 410 to notions of risk and comfort by evaluating the prediction data 275B in relation to a vehicle's position and potential maneuvers (e.g., vehicle trajectories 425). Risk is evaluated by the avoidance metric 455 based on the prediction data's ability to protect the space actually occupied by an object (e.g., a testing object 335). Comfort is evaluated by the availability metric 460 based on the extent to which the prediction data 275B deprived a vehicle of available maneuvers (e.g., portions of the vehicle trajectories 425) due to an inaccurate prediction of the space occupied by an actual object. Each of the performance metrics 450 can be determined by the system 440 which can consider all aspects of the prediction data 275B (e.g., a predicted position, orientation, shape, uncertainty, etc.) output by the object prediction model 410 with respect to potential maneuvers (e.g., vehicle trajectories 425) of the vehicle.

To do so, the system 440 can receive trajectory data 420 indicative of a number of vehicle trajectories 425 of an autonomous vehicle. The trajectory data 420, for example, can be indicative of a plurality of vehicle trajectories 425 for an autonomous vehicle with respect to a testing environment (e.g., a real-world or simulation environment). For instance, the plurality of vehicle trajectories 425 can include a respective vehicle trajectory for every potential vehicle maneuver over a testing time frame (e.g., one or more seconds, minutes, etc.) within the testing environment. By way of example, the plurality of vehicle trajectories can include a set of fixed maneuvers the vehicle may make within the testing environment over the testing time period.

A vehicle trajectory 425 can be represented as region of fixed area (e.g., the autonomous vehicle's body) moving through time. At a given time, the region of fixed area can include a vehicle footprint. The vehicle trajectory 425 can be indicative of a plurality of vehicle footprints of the autonomous vehicle at a corresponding plurality of time steps of the testing time frame. For example, each vehicle footprint can represent a spatial area within the testing environment that is occupied by the autonomous vehicle at a respective time step of the testing time frame. In some implementations, each of the plurality of vehicle footprints can be represented as a plurality of cells within a spatio-temporal occupancy grid.

Figure 5:
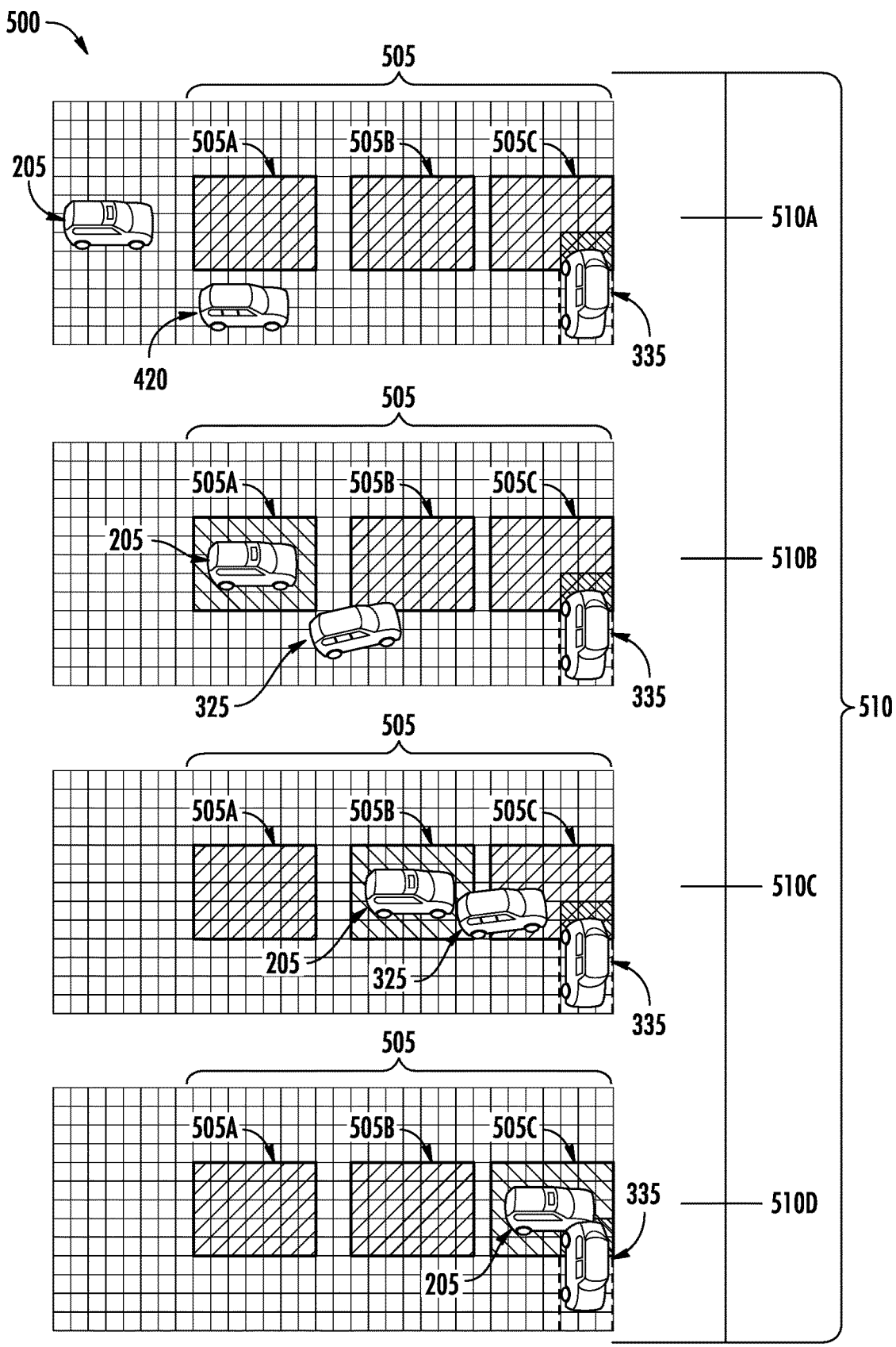
FIG. 5 is an example of a spatio-temporal occupancy grid, according to some implementations of the present disclosure.

FIG. 5, for instance, is an example spatio-temporal occupancy grid 500, according to some implementations of the present disclosure. The spatio-temporal occupancy grid 500 is descriptive of a testing environment with a testing object 335, a predicted object 325, and a vehicle trajectory 505 with vehicle footprints 505A-C corresponding to time steps 510A-D of the testing time frame 510. As depicted, the vehicle trajectory 505 for the vehicle 205 can be represented as a sequence of vehicle footprints 505A-C respectively corresponding to a plurality of time steps 510A-D of the testing time frame 510.

The vehicle footprints 505A-C for each time step of the plurality of time steps 510A-D of the testing time frame 510 can each include a plurality of vehicle cells within the spatio-temporal occupancy grid 500. For example, the spatio-temporal occupancy grid 500 can include a plurality of cells representative of a testing environment (e.g., real-world, simulated, etc.). The plurality of vehicle cells for each vehicle footprint 505A-C can represent a region of fixed area within the testing environment that corresponds to a body of the autonomous vehicle at each time step 510A-D. By way of example, at time step 510A, the vehicle trajectory 505 can include a plurality of future footprints 505A-C. At time step 510B, the vehicle 205 can occupy a first footprint 505A according to the vehicle trajectory 505. At time step 510C, the vehicle 205 can occupy a second footprint 505B according to the vehicle trajectory 505. And, at time step 510D, the vehicle 205 can occupy a third footprint 505C according to the vehicle trajectory 505.

Figure 6A:
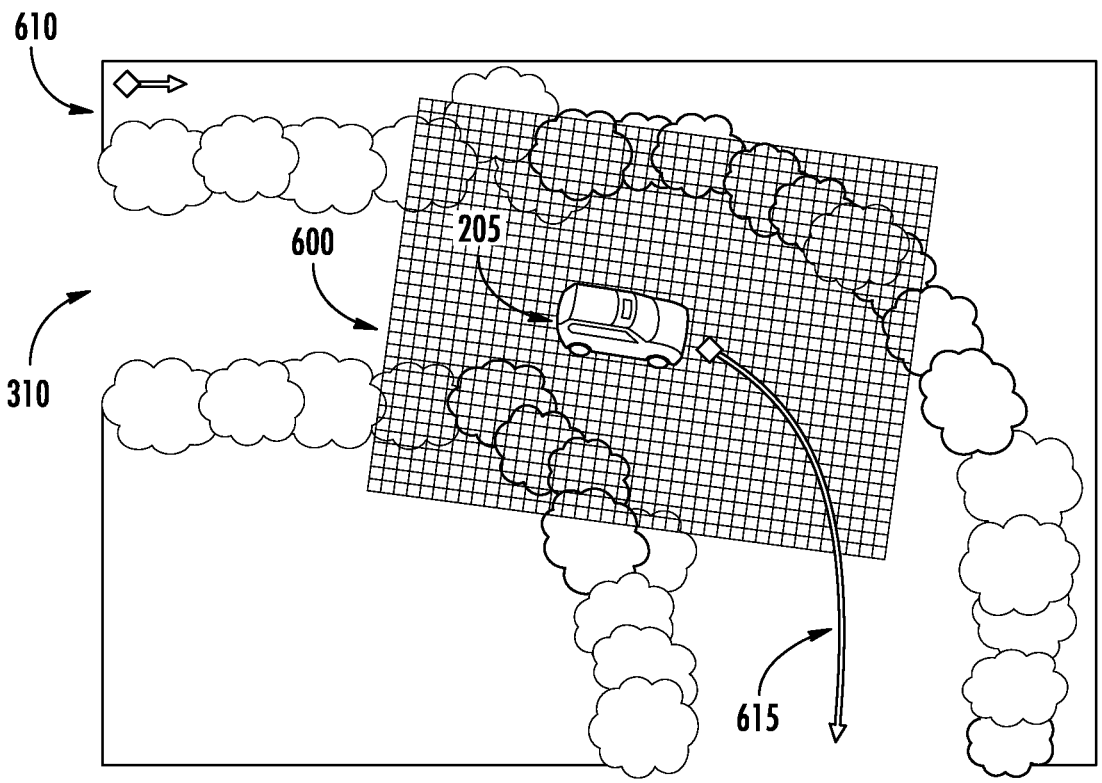
FIGS. 6A-B are examples of various implementations of a spatio-temporal occupancy grid, according to some implementations of the present disclosure.
Figure 6B:
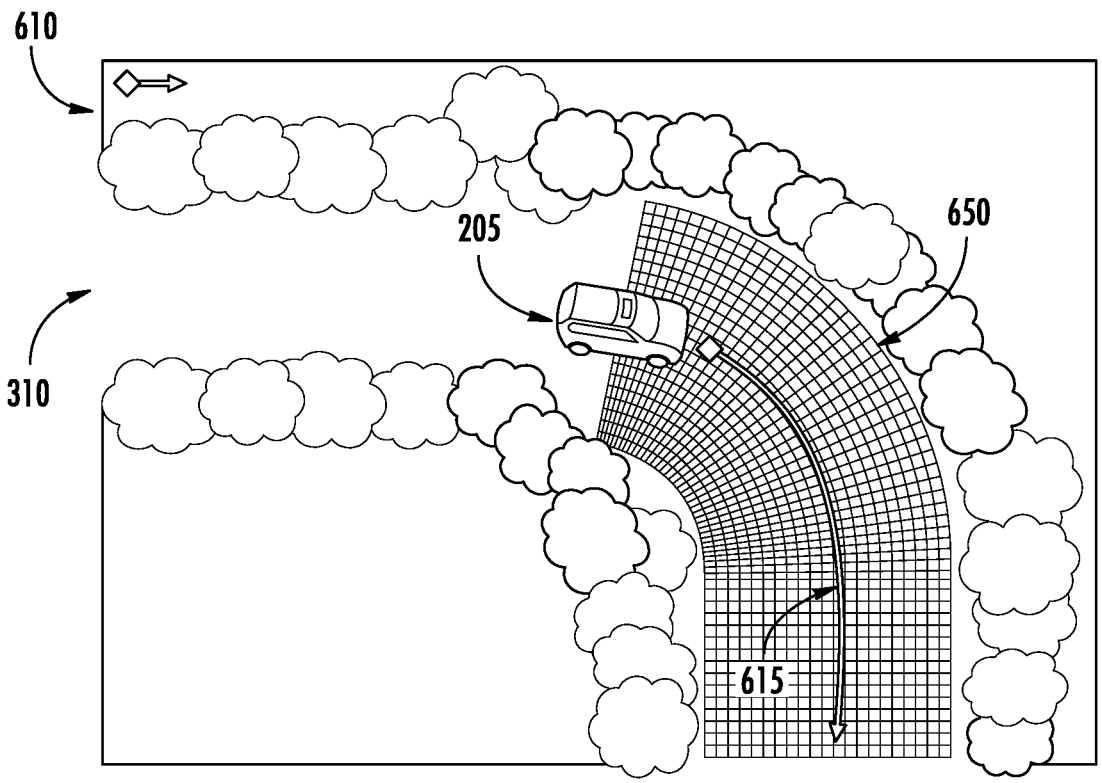

The spatio-temporal occupancy grid 500 can correspond to a real-world or simulated testing environment (e.g., as described herein with reference to FIG. 1). In some implementations, the spatio-temporal occupancy grid 500 can be performant, agnostic to road-geometry, and generalized to various real-world and/or simulated testing scenes. FIGS. 6A-B, for example, are various example implementations of a spatio-temporal occupancy grid, according to some implementations of the present disclosure.

FIG. 6A is an example of a spatio-temporal occupancy grid 600 represented by a naive cartesian grid defined by generic cartesian coordinates. The spatio-temporal occupancy grid 600 can result in a situation in which much of the grid is irrelevant (e.g., covering area outside of a road 310 where the vehicle 205 is unlikely to travel). To increase the usable space of the spatio-temporal occupancy grid 600, the cartesian grid can be adapted to an intended path 615 of the vehicle 205.

FIG. 6B is an example of a spatio-temporal occupancy grid 650 represented by a curvilinear mesh that respects road-geometry. The spatio-temporal occupancy grid 650 can be adapted to the intended path 615 of the vehicle 205. For example, the spatio-temporal occupancy grid 650 can be defined by path-relative coordinates adapted to the intended path 615 of the vehicle 205. The intended path 615 of the vehicle 205 can be based at least in part on a road geometry of road 310 associated with the testing environment 610. The spatio-temporal occupancy grid 650 can be produced using the intended path's inverse path-relative transform. More particularly, a path-relative transformation can be performed to generate the spatio-temporal occupancy grid 650. For example, to transform a point $p_{abs}=(x,y)$ from real-world coordinates into path-relative coordinates, $p_{pr}=(a, c)$, the origin can be defined as the closest point on the intended path 615 to the position of the vehicle 205. The closest point on the intended path 615 to $p_{abs}$ is found and called $p_{proj}$. The along-path distance from the origin to $p_{proj}$ gives the along-track coordinate, a. The distance between $p_{abs}$ and $p_{proj}$ along the normal to the intended path 615 at $p_{proj}$ gives the cross-track coordinate, c. The inverse transformation can be similarly defined; for example, given (a, c) in path-relative coordinates, a distance can be advanced along the intended path 615. From there, c can be shifted in the normal direction to get $p_{abs}$.

Turning back to FIG. 4, the system 440 can receive the trajectory data 420 of the autonomous vehicle from a machine-learning motion planning model configured to perform the one or more motion planning operations for the autonomous vehicle. By way of example, the trajectory data 420 can be received from a motion planning model (e.g., used for motion planning functions 270C). In some implementations, the motion planning model can be used to produce the plurality of vehicle trajectories 425 based at least in part on the prediction data 275B. The motion planning model, for example, can be configured to output a plurality of candidate vehicle trajectories. The candidate vehicle trajectories can be analyzed, scored, and/or ranked by the machine-learning motion planning model. In some implementations, each of the plurality of vehicle trajectories 425 can be associated with a trajectory probability (e.g., a likelihood of implementation). For example, the motion planning model can be configured to output trajectory data 420 including a trajectory probability associated with a plurality of footprints of a trajectory of the autonomous vehicle. In such a case, the system 440 can determine the probability that a particular footprint is reached by the autonomous vehicle based at least in part on the trajectory probability associated with the plurality of footprints of the autonomous vehicle. As described in further detail herein, the performance metrics 450 can be based at least in part on the trajectory probability associated the plurality of footprints of the autonomous vehicle.

In addition, or alternatively, the trajectory data 420 can be generated by the system 440, for example, to reduce computational burden of running a full motion planning model. In such a case, the system 440 can generate trajectory data 420 representing a performance approximation of the motion planning model that uses a path-relative transformation. For instance, the system 440 can generate the trajectory data 420 indicative of the vehicle trajectories 425 of an autonomous vehicle based at least in part on the intended path (e.g., intended path 615 of FIG. 6) of the autonomous vehicle. In some implementations, the system 440 can determine a trajectory probability for the vehicle trajectories 425 indicative of a probability that the autonomous vehicle reaches at least one of a plurality of footprints associated with the vehicle trajectories 425 of the autonomous vehicle. In such a case, the system 440 can determine the probability that a particular footprint is reached by the autonomous vehicle based at least in part on the trajectory probability associated with the plurality of footprints of the autonomous vehicle.

Figure 7:
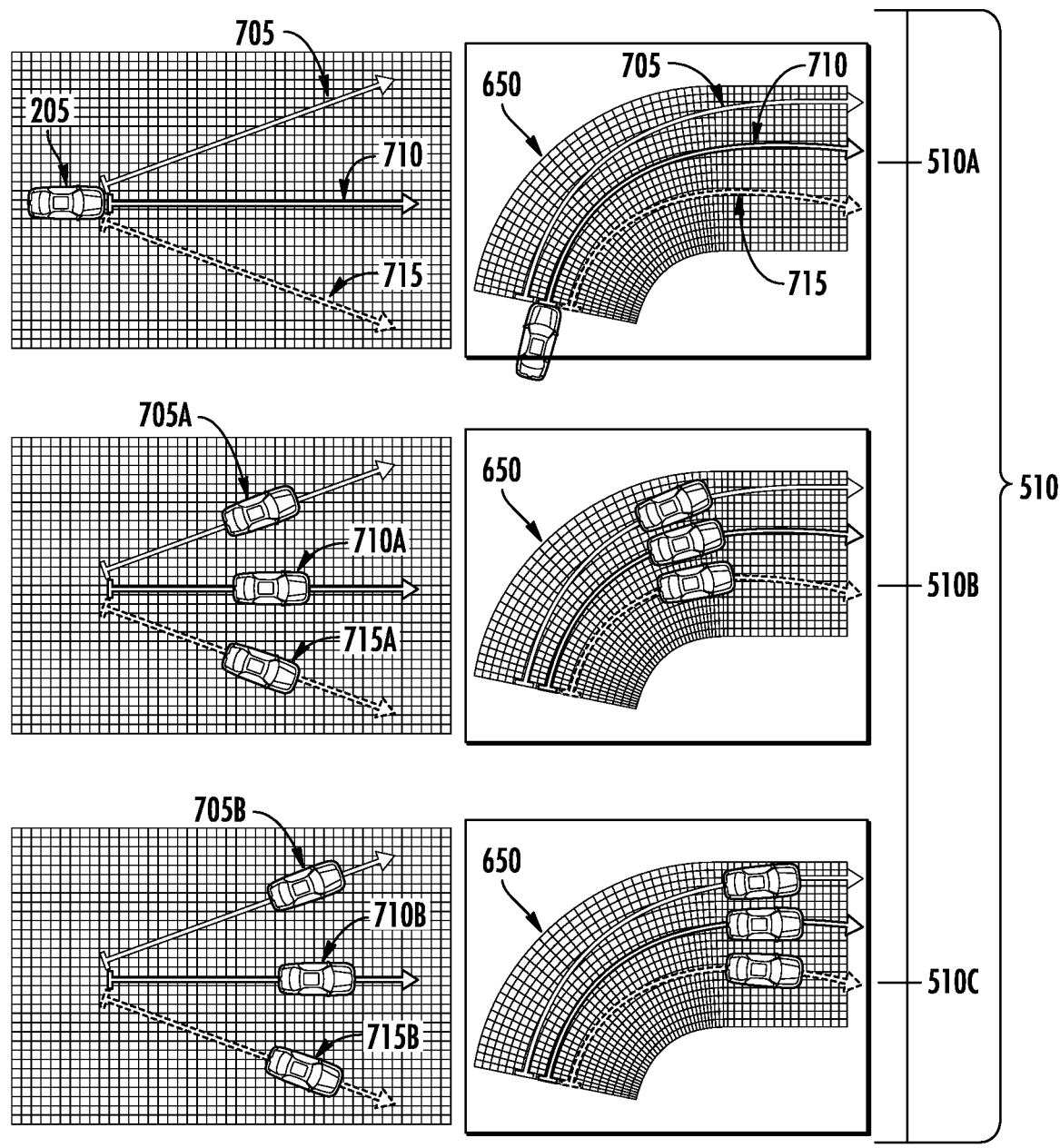
FIG. 7 is an example of evaluation trajectories, according to some implementations of the present disclosure.

More particularly, FIG. 7 is an example of evaluation trajectories generated to approximate vehicle trajectories, according to some implementations of the present disclosure. The evaluation trajectories 705-715 can include a set of fixed vehicle trajectories generated to approximate a full set of dynamically feasible maneuvers for the vehicle 205. The evaluation trajectories 705-715 can be produced in path-relative space (e.g., spatio-temporal occupancy grid 650) with constant acceleration and zero steering angle over a testing time frame 510. Each of the evaluation trajectories 705-715 can include respective vehicle footprints 705A-B, 710A-B, 715A-B respectively corresponding to the time steps 510A-C of the testing time frame 510. When transformed into real-world coordinates, the evaluation trajectories 705-715 can be spatially appropriate for a scene as shown by FIG. 7. Once generated, the set of evaluation trajectories 705-715 can be applied to any scene, given an intended path (e.g., intended path 615). In some implementations, as described in detail herein, a probability that the vehicle 205 will reach each vehicle footprint 705A-B, 710A-B, 715A-B of the evaluation trajectories 705-715 can be determined.

Turning back to FIG. 4, the system 440 can receive testing object data 430 and prediction data 275B. The testing object data 430 can be indicative of a testing object 335 in an environment of an autonomous vehicle. For example, the testing object 335 can correspond to a simulated and/or real-world object in the environment. The prediction data 275B can be indicative of one or more predicted object trajectories 320 in the environment of the autonomous vehicle. In some implementations, the system 440 can receive prediction data 275B and/or testing object data 430 for each respective vehicle trajectory of the trajectory data 420.

The testing object data 430 (and/or a testing object 335 thereof) can correspond in space and time to a particular vehicle footprint of the plurality of vehicle footprints of a respective vehicle trajectory. By way of example, the testing object data 430 can be indicative of the presence of a real-world object (e.g., detected by one or more redundant and/or supervisory systems) and/or a simulated object (e.g., labeled ground truth objects, etc.) located, in space and time, corresponding to the particular vehicle footprint. For instance, the testing object data 430 can be indicative of a testing object 335 that occupies at least a portion of the space covered by a particular vehicle footprint at a particular time step corresponding to the particular vehicle footprint. The prediction data 275B can be indicative of one or more predicted object trajectories 320 relative to a respective vehicle trajectory. The prediction data 275B, for example, can include a prediction output of the object prediction model 410. For example, the prediction output can be received from the machine-learning object prediction model 410.

By way of example, with reference to FIG. 5, the spatio-temporal occupancy grid 500 includes an example representation of one or more testing objects 335 (e.g., based on testing object data 430) and/or one or more predicted objects 325 (e.g., based on prediction data 275B) relative to the vehicle trajectory 505. The prediction data 275B can include an indication of the presence of a predicted object 325 relative to the vehicle trajectory 505 at one or more time steps 510A-D of the testing time frame 510. The testing object 335 can include an indication of the presence of a testing object 335 relative to the vehicle trajectory 505 at one or more time steps 510A-D of the testing time frame 510. The predicted object 325 and the testing object 335 can be represented in the spatio-temporal occupancy grid 500 as a predicted object footprint (e.g., a fixed area in space corresponding to the predicted object 325 at a respective time step 510A-D) and a testing object footprint (e.g., a fixed area in space corresponding to the testing object 335 at a respective time step 510A-D), respectively.

As described in further detail herein, in some implementations, a predicted object 325 and/or a testing object 335 can block one or more vehicle footprints subsequent to a vehicle footprint corresponding to the predicted object 325 and/or the testing object 335. For example, when executing the vehicle trajectory 505, the vehicle 205 can be prevented from reaching a subsequent footprint (e.g., vehicle footprint 505C) because it must plan to stop before a preceding footprint (e.g., vehicle footprint 505B) due to the predicted presence of the predicted object 325. Therefore, a preceding footprint can, at times, block a subsequent footprint. As a particular example, as depicted in spatio-temporal occupancy grid 500, the testing object 335 can be blocked by predicted object 325 at the time step 510C earlier than the time step 510D at which the testing object 335 occupies the vehicle footprint 505C. In this manner, predictions such as the predicted object 325 can have the effect of blocking real-world objects since they induce the vehicle 205 to stop.

For example, the predicted object 325 and the testing object 335 can at least partially overlap (e.g., occupy) at least one of the vehicle footprints 505A-C at one or more of the plurality of time steps 510A-D. As an example, the predicted object 325 can at least partially occupy vehicle footprint 505B at time step 510C and the testing object 335 can at least partially occupy the vehicle footprint 505C at time steps 510A-D. In such a case, prediction data indicative of the predicted object 325 can prevent the vehicle 205 from reaching (e.g., by blocking the vehicle 205) the vehicle footprint 505C. In this manner, the prediction data can enable the vehicle 205 to avoid the testing object 335 by replanning the vehicle trajectory 505 before the vehicle 205 reaches the testing object 335.

As another example, if the testing object 335 queued in front of a line of other testing objects (e.g., cars in a traffic jam), the other testing objects immediately behind the testing object 335 can block the testing object 335 from the vehicle 205. In such a case, testing object 335 can be considered unexposed to the vehicle 205.

Turning back to FIG. 4, the prediction data 275B can include a range of different prediction formats including trajectories, occupancy grids, arbitrary probability distributions, etc. As one example, the prediction data 275B can be indicative of a predicted cell occupancy probability (e.g., of a predicted object footprint, etc.) for at least one cell of a plurality of cells of a spatio-temporal occupancy grid (e.g., the spatio-temporal occupancy grid 500) for at least one time step of a plurality of time steps (e.g., time steps 510A-D) of a testing time frame (e.g., testing time frame 510). In addition, or alternatively, the system 440 can determine the predicted cell occupancy probability for at least one of the plurality of cells of the spatio-temporal occupancy grid for the at least one time step of the plurality of time steps of the time frame based at least in part on prediction data 275B of another format (e.g., an object trajectory, probability distribution, etc.).

The system 440 can output the performance metrics 450 based at least in part on the prediction data 275B, the trajectory data 420, and the testing object data 430. For example, the performance metrics 450 can be generated for the object prediction model 410 based at least in part on each of the plurality of vehicle trajectories 425 of the autonomous vehicle (e.g., the trajectory data 420), the testing object 335 (e.g., the testing object data 430), and the one or more predicted object trajectories 320 (e.g., prediction data 275B output by the object prediction model 410). The performance metrics 450 can include an avoidance metric 455 and an availability metric 460. The avoidance metric 455 is indicative of how well the prediction data 275B (e.g., the predicted object trajectories 320) protects an exposed testing object 335 (e.g., of the testing object data 430) within a distribution of vehicle trajectories 425 (e.g., trajectory data 420). The availability metric 460 is indicative of a portion (e.g., fraction, percentage, etc.) of available space that is needlessly blocked by the prediction data 275B. Each metric can be computed and marginalized across all of the plurality of vehicle trajectories 425 of the trajectory data 420.

By way of example, the testing object data 430 can be indicative of an exposed testing object 335 that occupies at least a portion of a particular footprint (e.g., footprint 505C of FIG. 5) at a particular time step (e.g., time step 510D of FIG. 5) corresponding to the particular footprint.

The avoidance metric 455 can quantify a probability that a prediction (e.g., as identified by the prediction data 275B) blocks the particular footprint at or before the particular time step. The avoidance metric 455, for example, can quantify a probability that (i) the testing object 335 occupies at least the portion of the particular footprint (e.g., occupied), (ii) the particular footprint is reached by the autonomous vehicle (e.g., reached), (iii) the testing object 335 (e.g., the particular footprint) is not blocked by at least one of the one or more predicted object trajectories 320 at or before the particular time step (e.g., unblocked), and (iv) the testing object 335 (e.g., the particular footprint) is not blocked by another testing object at a time step preceding the particular time step (e.g., exposed to the autonomous vehicle).

The availability metric 460 can quantify a portion (e.g., fraction, percentage, etc.) of one or more available vehicle footprints (e.g., footprints that are not occupied by a testing object 335) of the autonomous vehicle that are blocked by at least one of the one or more predicted object trajectories 320 (e.g., as identified by the prediction data 275B). The availability metric 460, for example, can quantify a portion of the one or more available vehicle footprints of the autonomous vehicle that occur before the particular footprint that are (i) not occupied by the testing object 335 (e.g., unoccupied), (ii) reached by the autonomous vehicle (e.g., reached), (iii) blocked by at least one of the one or more predicted object trajectories 320 (e.g., blocked), and (iv) not blocked by another testing object at a time step preceding the particular time step (e.g., exposed).

For example, the system 440 can determine the performance metrics 450 based on the probability that the autonomous vehicle reaches the particular footprint of the autonomous vehicle. As described herein, the trajectory data 420 can be indicative of the trajectory probability for each of the vehicle trajectories 425. For example, the trajectory probability can identify a footprint probability for each respective footprint of the autonomous vehicle indicative of a probability that the autonomous vehicle will reach the respective footprint at a corresponding time step of the time range. In some implementations, the probability for each respective footprint can decrease at one or more subsequent time steps as an uncertainty for each respective footprint increases due the increased likelihood of the occurrence of unanticipated events.

In some implementations, the system 440 can determine the footprint probability for each respective footprint of the autonomous vehicle (e.g., of the one or more evaluation trajectories 705-715 of FIG. 7). For example, independent distributions $f_\theta$ and $f_\alpha$ can be defined over an initial heading $\theta$ and acceleration a of the autonomous vehicle in path-relative space (e.g., spatio-temporal occupancy grid 650 of FIG. 7). Given a starting velocity of $v_i$ and a footprint time t, a density of possible footprint centers in polar coordinates can be defined using $f_\theta(\theta)$ and applying a change of variables to $f_\alpha(\alpha)$, $$f(r, \theta \mid v_i, t) = \frac{2}{t^2} f_\alpha\left(\frac{2(r - v_i t)}{t^2}\right) f_\theta(\theta)$$

In some implementations, a constant acceleration and heading can be assumed. Cartesian coordinates can be transformed, and the density can be uniformly distributed over time up to a time horizon $T_{max}$, $$f(x, y, t \mid v_i) = \begin{cases} \dfrac{2}{T_{max} t^2} \dfrac{f_\alpha\left(\dfrac{a\sqrt{x^2 + y^2} - v_i t}{t^2}\right)}{\sqrt{x^2 + y^2}} f_\theta\left(\tan^{-1}\left(\dfrac{y}{x}\right)\right), \\ \quad t \in (0, T_{max}] \\ 0, \text{ otherwise} \end{cases}$$

The probability of each footprint can be determined by, $$P(F_t^{x,y,v_i} \text{ is Reached}) = \int_{x-\Delta x}^{x-\Delta x} \int_{y-\Delta y}^{y+\Delta y} \int_{t-\Delta t}^{t+\Delta t} f(x, y, t \mid v_i) dx dy dt \approx f(x, y, t \mid v_i) \Delta x \Delta y \Delta t$$

where $\Delta x$, $\Delta y$, and $\Delta t$ can be granularities with which the continuous spatio-temporal space of footprints can be discretized.

The system 440 can determine the performance metrics 450 based on the probability (e.g., (F is Reached)) (e.g., as output by a motion planning model, determined by the system 440, etc.) that each footprint of the plurality of footprints of the autonomous vehicle is reached.

In addition, or alternatively, the system 440 can determine the performance metrics 450 based on a probability that a particular footprint is blocked by at least one of the one or more predicted object trajectories 320 of the prediction data 275B. The system 440 can determine whether a respective footprint of the autonomous vehicle is blocked based on whether at least one predicted object trajectory 320 overlaps the respective footprint at a corresponding time step or any footprints preceding the respective footprint at a time step preceding the corresponding time step. For example, the system 440 can determine that the one or more predicted object trajectories 320 do not overlap the particular footprint at the particular time step and do not overlap any footprint preceding the particular footprint at time steps preceding the particular time step. In such a case, the system 440 can determine that the particular footprint is not blocked by the one or more predicted object trajectories 320. As another example, the system 440 can determine that the one or more predicted object trajectories 320 (i) overlap the particular footprint at the particular time step or (ii) overlap at least one preceding footprint at one or more time steps preceding the particular time step. In such a case, the system 440 can determine that the particular footprint is blocked by the one or more predicted object trajectories 320. In this way, the particular footprint may be blocked by the one or more predicted object trajectories 320 even if the one or more predicted object trajectories 320 only overlap a footprint preceding the particular footprint (e.g., and not the particular footprint itself) because the autonomous vehicle will be stopped at the preceding footprint (e.g., due to the predicted object trajectories 320) before it travels to the particular footprint.

A probability that a particular footprint is blocked by the one or more predicted object trajectories 320 can be determined based on a footprint occupancy probability for each vehicle footprint of the autonomous vehicle. The footprint occupancy probability for each vehicle footprint of the autonomous vehicle can be determined based at least in part on the prediction data 275B. The footprint occupancy probability, for example, can be indicative of a probability that at least one of a plurality of vehicle cells of a respective vehicle footprint is overlapped (e.g., occupied) by a predicted object (e.g., an object footprint, etc.) corresponding to at least one of the one or more predicted object trajectories 320.

The footprint occupancy probability for each footprint of the autonomous vehicle can be based at least in part on a predicted cell occupancy probability for each cell of the spatio-temporal occupancy grid (e.g., grid 500) at each time step (e.g., time steps 510A-D) of the testing time range (e.g., testing time frame 510). For example, in some implementations, the prediction data 275B can include the predicted cell occupancy probability for each cell of the plurality of cells of the spatio-temporal occupancy grid for each time step of the plurality of time steps. In addition, or alternatively, the predicted cell occupancy probability for each cell of the spatio-temporal occupancy grid can be determined based on the prediction data 275B. The predicted cell occupancy probability can identify a probability of whether at least one cell of the spatio-temporal occupancy grid is occupied by a predicted object at a corresponding time step.

For example, with reference to FIG. 5, in the example spatio-temporal occupancy grid 500, a predicted probability that a cell x is occupied can be denoted as $P_{pred}(x)$. A vehicle footprint (e.g., footprint 505A) at a respective time t (e.g., time step 510B) can be denoted as $F_t$, the predicted probability that at least one cell in the footprint $F_t$ is occupied can be denoted as, $$P_{pred}(F_t \text{ is Occupied}) = 1 - \prod_{x \in F_t}[1 - P_{pred}(x)]$$

A respective footprint (e.g., footprint 505A) can be unblocked by the predicted object 325 if the respective footprint (e.g., footprint 505A) is not occupied by the predicted object 325 at a time step (e.g., time step 510B) corresponding to the respective footprint (e.g., footprint 505A) and if each footprint preceding the respective footprint is not occupied by the predicted object 325 at each preceding time step corresponding to each preceding respective footprint. For example, at time H, the probability of $F_H$ being unblocked (e.g., unprotected) by the predicted object 325 can be the joint probability that the predicted object 325 does not occupy any footprint up to and including the footprint H:

$$P(F_H \text{ is Unprotected}) = \prod_{t=t_1}^{H}[1 - P_{pred}(F_t \text{ is Occupied})]$$

where $t_1$ can correspond to first footprint of interest (e.g., footprint 505A). By way of example, in the example spatio-temporal occupancy grid 500, the probability that vehicle footprint 505C is unblocked (e.g., unprotected) can be given as:

$$
\begin{aligned}
P(\text{Footprint } 405C \text{ is Unprotected}) &= [1 - P_{pred}(\text{Footprint } 505A \text{ is Occupied})] \cdot \\
&\quad [1 - P_{pred}(\text{Footprint } 505B \text{ is Occupied})] \cdot \\
&\quad [1 - P_{pred}(\text{Footprint } 505C \text{ is Occupied})] \\
&= \left[1 - \left(1 - \prod_{x \in \text{Footprint } 405A}[1 - P_{pred}(x)]\right)\right] \cdot \\
&\quad \left[1 - \left(1 - \prod_{x \in \text{Footprint } 405B}[1 - P_{pred}(x)]\right)\right] \cdot \\
&\quad \left[1 - \left(1 - \prod_{x \in \text{Footprint } 405C}[1 - P_{pred}(x)]\right)\right] \cdot \\
&= [1 - (1 - (1 - 0)^{35})] \cdot [1 - (1 - (1 - 0)^{33}(1 - 1)^2)] \cdot \\
&\quad [1 - (1 - (1 - 0)^{35})] = 1 \cdot 0 \cdot 1 = 0
\end{aligned}
$$

The system 440 can determine the footprint occupancy probability for each footprint of the autonomous vehicle based at least in part on the predicted cell occupancy probability for each cell of the spatio-temporal occupancy grid at the time step of the testing time range. By way of example, the system 440 can determine that a respective footprint in occupied (and therefore blocked) in the event that at least one vehicle cell of the respective footprint is occupied by a predicted object associated with at least one of the predicted object trajectories 320 at a time step corresponding to the respective vehicle footprint.

the result can quantify the intuition that the predicted object 325 blocks the vehicle 205 from the vehicle footprint 505C corresponding in time (e.g., time step 510D) and space (e.g., footprint 505C) with the testing object 335 because the vehicle footprint 505B is occupied by the predicted object 325 at time step 510C and precedes the vehicle footprint 505C.

In some implementations, a probability that a respective footprint is unblocked by anther testing object preceding the testing object 335 can be determined. A respective footprint can be unblocked by another testing object in the event that another testing object does not occupy any footprint preceding the respective footprint. Note that the respective footprint occupied by the testing object 335 is not credited as blocking itself. Therefore, the respective footprint is unblocked by the testing object 335 even if the testing object 335 occupies the respective footprint. By way of example, the testing object 335 of FIG. 4 can occupy vehicle footprint 505C. Therefore, none of the footprints 505A-C are blocked by the testing object 335. The testing object 335 can occupy a respective footprint in the event that the testing object 335 (e.g., a footprint thereof) overlaps (e.g., occupies) at least one vehicle cell of the respective footprint at a time step corresponding to the respective footprint. For example, in some implementations, the probability that the testing object 335 occupies a respective cell of the spatio-temporal occupancy grid 500 can be determined by converting a ground-truth polygon into the spatio-temporal occupancy grid 500.

By way of example, the probability that a cell x is occupied by the testing object preceding the testing object 335 can be denoted as $P_{tobj}(x)$. For a given footprint, $F_t$ at time t of the vehicle trajectory 505, the probability that the footprint is occupied by the testing object 335 preceding the testing object 335 can be denoted as, $$P_{tobj}(F_t \text{ is Occupied}) = 1 - \prod_{x \in F_t}[1 - P_{tobj}(x)]$$

at time H, the probability that $F_H$ is unblocked (e.g., exposed) by another testing object can be the joint probability that another testing object does not occupy any footprint up but not including H:

$$P(F_H \text{ is Exposed}) = \prod_{t=t_1}^{H-1}[1 - P_{tobj}(F_t \text{ is Occupied})]$$

where $t_1$ can correspond to first footprint of interest (e.g., footprint 505A). Real-world objects (e.g., testing object 335) overlapping high-exposure footprints (e.g., unblocked by preceding testing object) are vulnerable, thus the performance metrics can prioritize protecting them by removing footprint blocked by a preceding testing object (e.g., unexposed objects) from the evaluation.

Turning back to FIG. 4, the system 440 can determine avoidance metric 455 by quantifying safety across each of the plurality of vehicle trajectories 425. To do so, the system 440 can detect the occurrence of one or more risky events across the plurality of vehicle trajectories 425. A risky event can be detected for a respective trajectory in the event that the prediction data 275B does not include a predicted object trajectory 320 that blocks a respective footprint of a reachable trajectory that is occupied by an exposed testing object 335 at or before a time step corresponding to the respective footprint.

By way of example, the plurality of vehicle trajectories 425 and their probabilities can be denoted as B. The testing time range can be denoted as T with time steps $\{0, 1, \ldots T_{max}\}$. The risky event can be denoted as $\lambda$ and can occur when the prediction data 275B does not protect an exposed testing object 335. This can be determined by, $$P(\lambda) = P(F \text{ is Unprotected, is Occupied} \mid F \text{ is Exposed, is Reached})$$

$$= \frac{\Sigma_{b,t \in B \times T} P(F_t^b \text{ is Reached}) d(F_t^b)}{\Sigma_{b,t \in S \times T} P(F_t^b \text{ is Reached}) e(F_t^b)}$$

where, $$d(F_t^b) = P(F_t^b \text{ is Unprotected}) \cdot P_{tobj}(F_t^b \text{ is Occupied}) \cdot P(F_t^b \text{ is Exposed})$$

$$e(F_t^b) = P(F_t^b \text{ is Exposed})$$

where, $P(F_t^b \text{ is Reached})$ is the probability of the vehicle 205 occupying $F_t^b$, its footprint at time t, while executing the trajectory b. Regions where $g(F_t^b)=0$ can represent footprints inaccessible to the vehicle 205 (e.g., unexposed) because they are blocked by the exposed testing object 335. As described herein, such footprints are excluded from the evaluation of the avoidance metric 455.

As a particular example, with reference to FIG. 5, where the vehicle trajectory 505 is the only trajectory being analyzed and each footprint 505A, 505B, 505C has an equal probability, the probability of the occurrence of a risky event $\lambda$ can be determined by, $$P(\lambda) = \frac{\frac{1}{3} \cdot h(\text{footprint } 505A) + \frac{1}{3} \cdot h(\text{footprint } 505B) + \frac{1}{3} \cdot h(\text{footprint } 505C)}{\frac{1}{3} \cdot g(\text{footprint } 505A) + \frac{1}{3} \cdot g(\text{footprint } 505B) + \frac{1}{3} \cdot g(\text{footprint } 505C)}$$

which captures the intuition of the predicted object 325 protecting the testing object 335.

As another example, for example where for the purposes of illustration the predicted object 325 can be considered a "testing object" and the testing object 335 is considered the "predicted object," the probability of the occurrence of a risky event $\lambda$ can be determined by, $$P(\lambda) = \frac{\frac{1}{3} \cdot h(\text{footprint } 505A) + \frac{1}{3} \cdot h(\text{footprint } 505B) + \frac{1}{3} \cdot h(\text{footprint } 505C)}{\frac{1}{3} \cdot g(\text{footprint } 505A) + \frac{1}{3} \cdot g(\text{footprint } 505B) + \frac{1}{3} \cdot g(\text{footprint } 505C)}$$

$$= \frac{\frac{1}{3} \cdot 1 \cdot 0 \cdot 1 + \frac{1}{3} \cdot 1 \cdot 1 \cdot 1 + \frac{1}{3} \cdot 1 \cdot 1 \cdot 0}{\frac{1}{3} \cdot 1 + \frac{1}{3} \cdot 1 + \frac{1}{3} \cdot 0} = .5$$

In this alternative example, the probability of the risky event, $\lambda$, is 0.5 because two equally likely footprints, footprints 505A-B are "reachable" to the vehicle 205 and one of them, footprint 505B, involves an object interaction (e.g., an exposed testing object 335). If interested in a particular predicted object of a plurality of predicted objects, in some implementations, the risky event can be marginalized over a subset of a plurality of trajectories that intercept the predicted object.

Turning back to FIG. 4, the system 440 can output a performance metric 450 (e.g., the avoidance metric 455) for a particular footprint of the plurality of footprints of the autonomous vehicle based at least in part on a trajectory of the autonomous vehicle (e.g., trajectory data 420), the testing object data 430, and the prediction data 275B. For example, the performance metric 450 can evaluate the prediction data 275B based at least in part on the trajectory data 420 for the autonomous vehicle, the testing object data 430, and the prediction data 275B. The performance metric 450 (e.g., the avoidance metric 455) can quantify the probability that (i) a particular footprint at a particular time step is reached by the autonomous vehicle, (ii) a testing object 335 is exposed at the particular footprint at the particular time step (e.g., not blocked by another testing object at a time step preceding the particular time step), and (iii) the testing object 335 is unprotected (e.g., not blocked by at least one of the one or more predicted object trajectories 320 at or before the particular time step).

The system 440 can determine the availability metric 460 by quantifying comfort across each of the plurality of vehicle trajectories 425. To do so, the system 440 can detect the occurrence of one or more comfort violations across the plurality of vehicle trajectories 425. A comfort violation can occur for a respective trajectory in the event that the prediction data 275B blocks a respective footprint that is not occupied by an exposed testing object 335. For example, the availability metric 460 can quantify a portion of one or more available footprints of the autonomous vehicle that are blocked by at least one of the one or more predicted object trajectories. The one or more available footprints can include one or more footprints of the autonomous vehicle occurring before a particular footprint occupied by the exposed testing object 335 that are (i) reached by the autonomous vehicle (e.g., reachable), (ii) not blocked by another testing object at a time step preceding the particular time step (e.g., exposed), and (iii) not occupied by the testing object at the particular time step (e.g., unoccupied).

By way of example, the system 440 can determine the availability metric 460 by identifying one or more obstructed footprints of the available footprints. For instance, the system 440 can determine, based on the plurality of vehicle trajectories 425 of the autonomous vehicle and the prediction data 275B, an overlap between a respective vehicle footprint (e.g., of a respective vehicle trajectory) and at least one of the one or more predicted object trajectories 320. The system 440 can determine the one or more obstructed footprints of the one or more available footprints of the autonomous vehicle based on the overlap (e.g., in space and time) between the respective vehicle footprint (e.g., of a respective vehicle trajectory) and at least one of the one or more predicted object trajectories 320. The one or more obstructed footprints, for example, can include the respective vehicle footprint that is occupied by a predicted object of at least one of the predicted object trajectories 320 and each vehicle footprint of the plurality of vehicle footprints of the respective vehicle trajectory that occur after the respective vehicle footprint (e.g., due to the autonomous vehicle stopping before the respective vehicle footprint to prevent a predicted interference). The performance metric can quantify the number of obstructed footprints relative to the available footprints for the autonomous vehicle.

As one example, a comfort violation can be denoted as $\xi$. The probability of a comfort violation, $P(\xi)$, can be denoted as, $$P(\xi) = P(F \text{ is Protected} \mid F \text{ is Exposed, is Unoccupied, is Reached})$$

$$= \frac{\sum_{b,t \in B \times T} P(F_t^b \text{ is Reached}) h(F_t^b)}{\sum_{b,t \in S \times T} P(F_t^b \text{ is Reached}) g(F_t^b)}$$

where, $$h(F_t^b) = (1 - P(F_t^b \text{ is Unprotected})) \cdot$$
$$(1 - P_{tobj}(F_t^b \text{ is Occupied})) \cdot P(F_t^b \text{ is Exposed})$$

$$g(F_t^b) = (1 - P_{tobj}(F_t^b \text{ is Occupied})) \cdot P(F_t^b \text{ is Exposed})$$

Regions where $g(F_t^b)=0$ can represent footprints inaccessible to the autonomous vehicle (e.g., unexposed) because they are blocked by the testing object 335. As described herein, such footprints are excluded from the evaluation of the avoidance metric 455.

As a particular example, with reference to FIG. 5, where the vehicle trajectory 505 is the only trajectory being analyzed and each footprint 505A, 505B, 505C has an equal probability, the probability of the occurrence of a comfort violation $\xi$ can be determined by, $$P(\xi) = \frac{\frac{1}{3} \cdot h(\text{footprint } 505A) + \frac{1}{3} \cdot h(\text{footprint } 505B) + \frac{1}{3} \cdot h(\text{footprint } 505C)}{\frac{1}{3} \cdot g(\text{footprint } 505A) + \frac{1}{3} \cdot g(\text{footprint } 505B) + \frac{1}{3} \cdot g(\text{footprint } 505C)}$$

$$= \frac{\frac{1}{3} \cdot 0 \cdot 1 \cdot 1 + \frac{1}{3} \cdot 1 \cdot 1 \cdot 1 + \frac{1}{3} \cdot 0 \cdot 0 \cdot 1}{\frac{1}{3} \cdot 1 \cdot 1 + \frac{1}{3} \cdot 1 \cdot 1 + \frac{1}{3} \cdot 0 \cdot 1} = .5$$

which illustrates a result in which the predicted object 325 arrives at a footprint 505B at a time step 510C preceding the particular footprint 505C and the particular timestep 510D at which the testing object 335 is located. Of the two available footprints 505A-B (e.g., footprints that are not occupied by the testing object 335), one footprint 505B is blocked by the predicted object 325, thus depriving the autonomous vehicle of half of its available footprints for the vehicle trajectory 505.

In this manner, the system 440 can output a performance metric 450 (e.g., the availability metric 460) for the prediction data 275B that quantifies a portion of one or more available footprints 505A-B of the vehicle 205 that are blocked by at least one of the one or more predicted object trajectories 320. The one or more available footprints 505A-B include one or more footprints 505A-B of the autonomous vehicle occurring before the particular footprint 505C at which an exposed testing object 335 (e.g., a testing that is not blocked by another testing object) is located in space and time (e.g., at the footprint 505C at timestep 510D). The avoidance metric 460 can quantify the probability that the one or more available footprints are (i) reached by the vehicle 205, (ii) not blocked by another testing object at a time step preceding the particular time step (e.g., exposed), (iii) not occupied by the testing object 335 at the particular time step (e.g., unoccupied), and (iv) blocked by at least one of the one or more predicted object trajectories 320 (e.g., protected).

Figure 8:
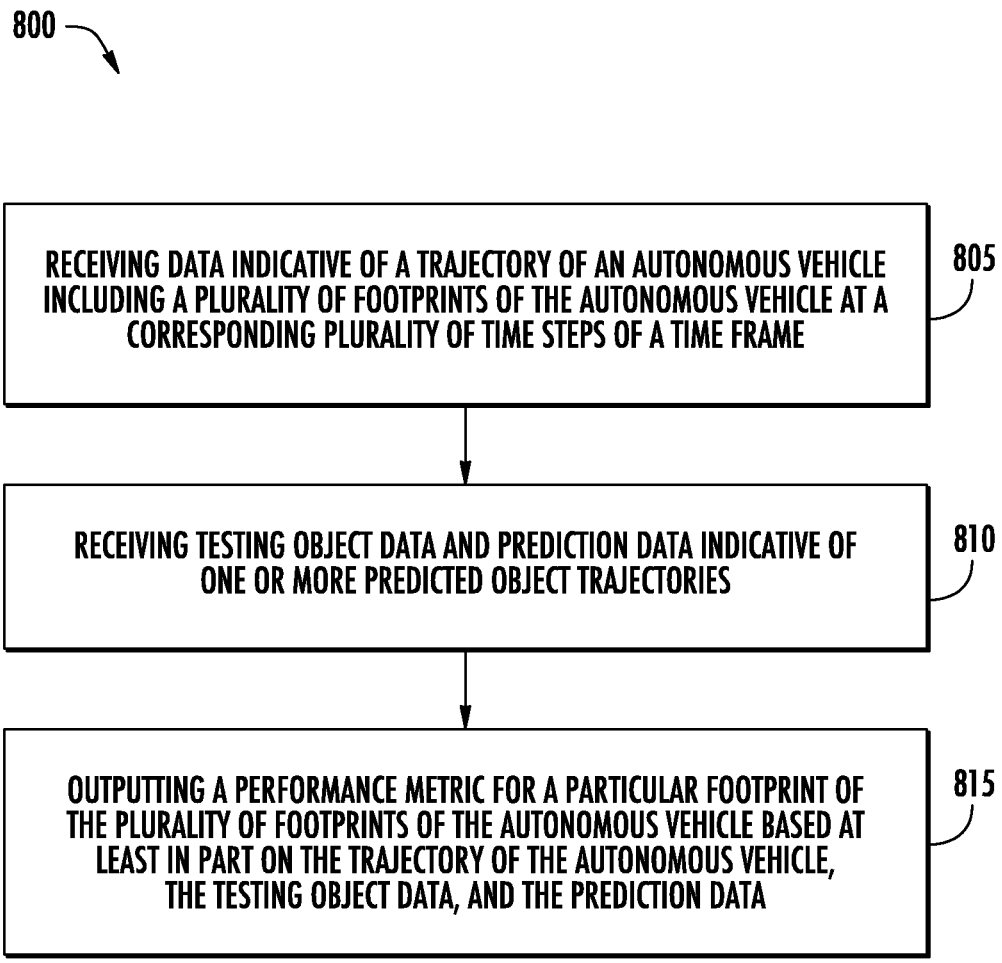
FIG. 8 is a flowchart of a method for outputting performance metrics, according to some aspects of the present disclosure.

FIG. 8 is a flowchart of a method 800 for outputting performance metrics, according to some aspects of the present disclosure. One or more portion(s) of the method 800 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 440, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-3, 12, etc.), for example, to output the performance metrics discussed herein. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 805, the method 800 includes receiving data indicative of a trajectory of an autonomous vehicle including a plurality of footprints of the autonomous vehicle at a corresponding plurality of time steps of a time frame. For example, a computing system (e.g., robotic platform 105, vehicle computing system 210, operations computing system(s) 290A, remote computing system(s) 290B, system 440, etc.) can receive the data indicative of the trajectory of the autonomous vehicle including the plurality of footprints of the autonomous vehicle at the corresponding plurality of time steps of the time frame.

At 810, the method 800 includes receiving testing object data and prediction data indicative of one or more predicted object trajectories. For example, the computing system can receive the testing object data and the prediction data indicative of one or more predicted object trajectories. The testing object data can be indicative of an object in an environment of the autonomous vehicle. The prediction data can be indicative of one or more predicted object trajectories in the environment of the autonomous vehicle. For example, the testing object data can correspond in space and time to a particular footprint of the plurality of footprints of the autonomous vehicle. For instance, the testing object data can be indicative of a testing object that occupies at least a portion of the particular footprint at a particular time step corresponding to the particular footprint.

At 815, the method 800 includes outputting a performance metric for a particular footprint of the plurality of footprints of the autonomous vehicle based at least in part on the trajectory of the autonomous vehicle, the testing object data, and the prediction data. For example, the computing system can output the performance metric for the prediction data based at least in part on the trajectory of the autonomous vehicle, the testing object data, and the prediction data. The performance metric can be output for the prediction data to evaluate the performance of the prediction data and/or one or more other autonomous functions.

Figure 9:
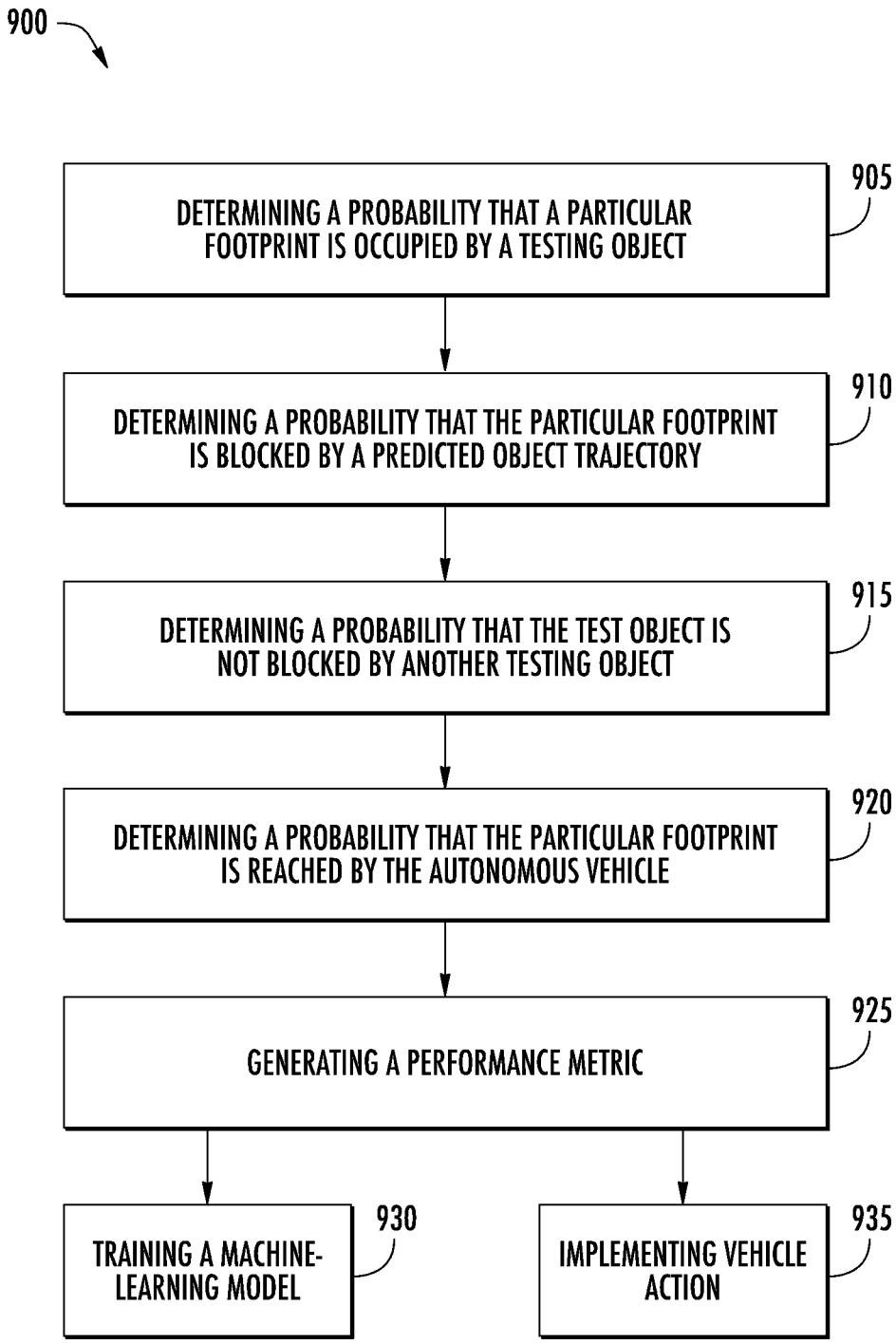
FIG. 9 is a flowchart of a method for generating performance metrics, according to some aspects of the present disclosure.

FIG. 9 is another flowchart of a method 900 for generating performance metrics according to some aspects of the present disclosure. One or more portion(s) of the method 900 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 440, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-3, 12, etc.), for example, to generate performance metrics. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

The method 900 can include a portion of step 815 of FIG. 8 where the method 800 includes outputting a performance metric for prediction data based at least in part on the trajectory of the autonomous vehicle, the testing object data, and the prediction data.

At 905, the method 900 includes determining a probability that a particular footprint is occupied by a testing object. For example, a computing system (e.g., robotic platform 105, vehicle computing system 210, operations computing system(s) 290A, remote computing system(s) 290B, system 440, etc.) can determine the probability that a particular footprint is occupied by a testing object in the manner described herein.

At 910, the method 900 includes determining a probability that the particular footprint is blocked by a predicted object trajectory. For example, the computing system can determine the probability that the particular footprint is blocked by the predicted object trajectory in the manner described herein.

At 915, the method 900 includes determining a probability that the testing object is not blocked by another testing object. For example, the computing system can determine the probability that the testing object is not blocked by another testing object in the manner described herein. As an example, the computing system can determine a probability of the particular footprint not being blocked by another object at a time step preceding the particular time step.

At 920, the method 900 includes determining a probability that the particular footprint is reached by the autonomous vehicle. For example, the computing system can determine the probability that the particular footprint is reached by the autonomous vehicle in the manner described herein. As an example, the computing system can determine a probability of the autonomous vehicle reaching the particular footprint during execution of the trajectory of the autonomous vehicle.

At 925, the method 900 includes generating a performance metric. For example, the computing system can generate the performance metric in the manner described herein.

At 930, the method 900 includes training a machine-learning model. For example, the computing system can train a machine-learning model based at least in part on the performance metric. For example, a machine-learning model trained at 930 can include, for example, a machine-learned model in the autonomy computing system 240 that is configured to perform one or more of the perception 270A, prediction 270B, or motion planning 270C functions. The machine-learning model can be trained to optimize the performance metric. In some implementations, the machine-learning model can be trained based on weighed performance metrics. For example, an avoidance metric can be prioritized over an availability metric during training.

At 935, the method 900 includes implementing vehicle action. For example, the computing system can implement the vehicle action. Implementing a vehicle action at 935 can include, for example, controlling one or more of the speed, acceleration, braking, or other action relative to a vehicle (e.g., an autonomous vehicle). In some instances, implementing a vehicle action at 935 can include determining a motion plan for the vehicle based at least in part on the performance metric(s) generated at 925.

Figure 10A:
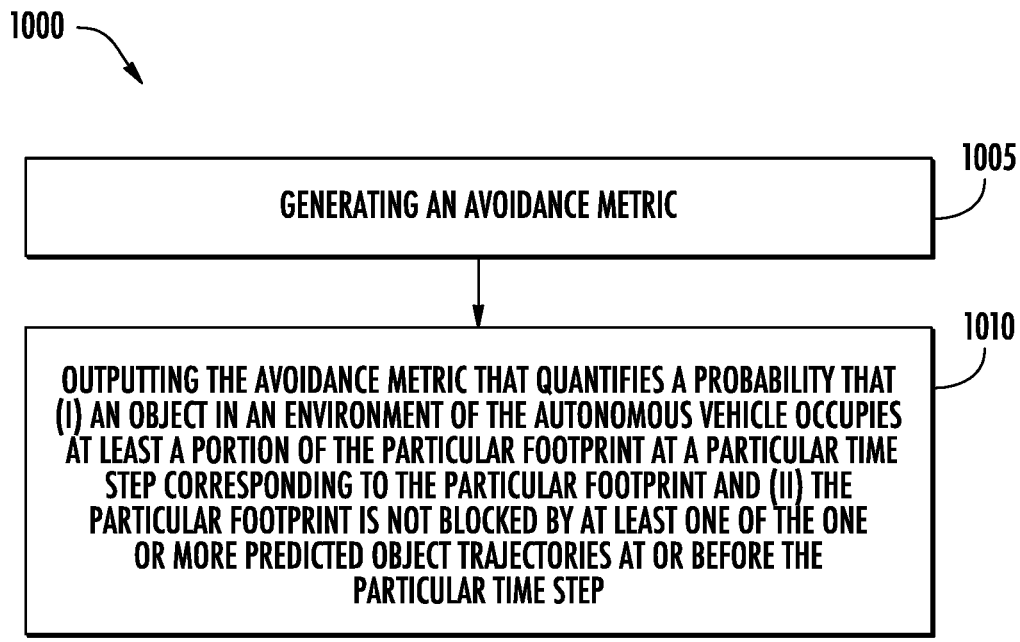
FIGS. 10A-B are flowcharts of methods for generating performance metrics, according to some aspects of the present disclosure.
Figure 10B:
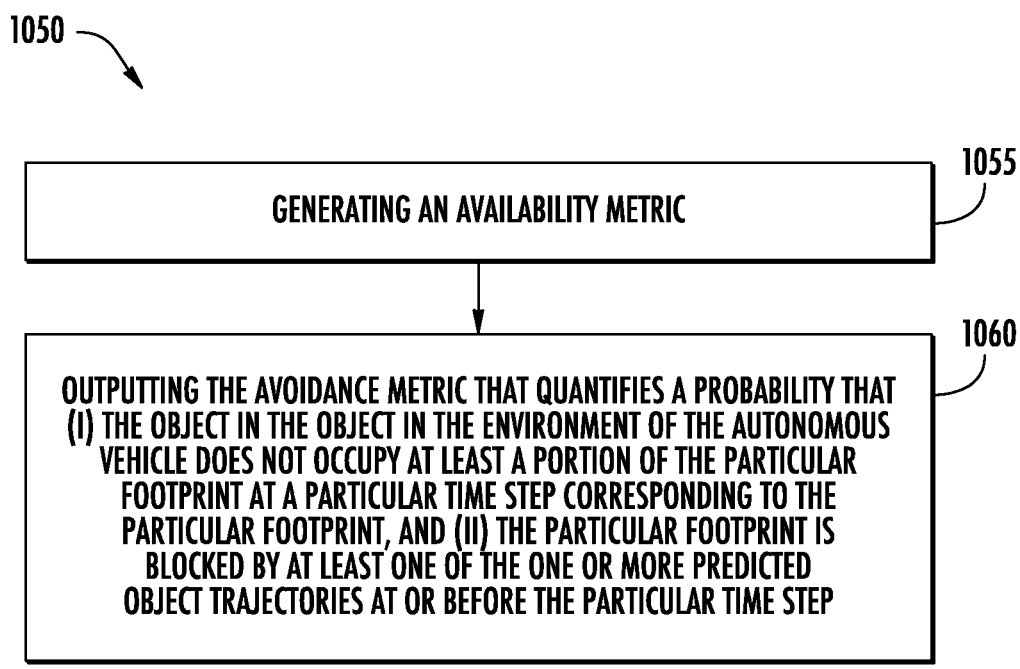

FIGS. 10A-10B are flowcharts of methods 1000, 1050 for generating performance metrics, according to some aspects of the present disclosure. In particular, method 1000 describes a method for generating an avoidance metric and method 1050 describes a method for generating an availability metric. One or more portion(s) of the methods 1000, 1050 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 440, etc.). Each respective portion of the methods 1000, 1050 can be performed by any (or any combination) of one or more computing devices. Moreover, one or more portion(s) of the methods 1000, 1050 can be implemented as an algorithm on the hardware components of the device(s) described herein (e.g., as in FIGS. 1-3, 12, etc.), for example, to generate respective performance metrics. FIGS. 10A-B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIGS. 10A-B is described with reference to elements/terms described with respect to other systems and figures for exemplary illustrated purposes and is not meant to be limiting. One or more portions of methods 1000, 1050 can be performed additionally, or alternatively, by other systems.

The methods 1000 and 1050 can include portions of step 925 of FIG. 9 where the method 900 includes generating a performance metric.

At 1005, the method 1000 includes generating an avoidance metric. For example, a computing system (e.g., robotic platform 105, vehicle computing system 210, operations computing system(s) 290A, remote computing system(s) 290B, system 440, etc.) can generate the avoidance metric, as described herein.

At 1010, the method 1000 includes outputting the avoidance metric that quantifies a probability that (i) a particular footprint is reached by the autonomous vehicle, (ii) the testing object is not blocked by another testing object at a time step preceding the particular time step, and (iii) the testing object is not blocked by at least one of one or more predicted object trajectories at or before the particular time step. For example, the computing system can output the avoidance metric that quantifies the probability that (i) the particular footprint is reached by the autonomous vehicle, (ii) the testing object is not blocked by another testing object at the time step preceding the particular time step, and (iii) the testing object is not blocked by the at least one of the one or more predicted object trajectories at or before the particular time step.

At 1055, the method 1050 includes generating an availability metric. For example, a computing system can determine the three-dimensional consistency measure for the initial object model parameters based, at least in part, the three-dimensional data. For example, the computing system can generate the availability metric.

At 1060, the method 1050 includes outputting the availability metric that quantifies a portion of one or more available footprints of the autonomous vehicle that are blocked by at least one of the one or more predicted object trajectories. For example, the computing system can output the availability metric that quantifies the portion of the one or more available footprints of the autonomous vehicle that are blocked by at least one of the one or more predicted object trajectories. The one or more available footprints include one or more footprints of the autonomous vehicle occurring before a particular footprint that are (i) reached by the autonomous vehicle, (ii) not blocked by another testing object at a time step preceding the particular time step, and (iii) not occupied by the testing object at the particular time step.

Figure 11:
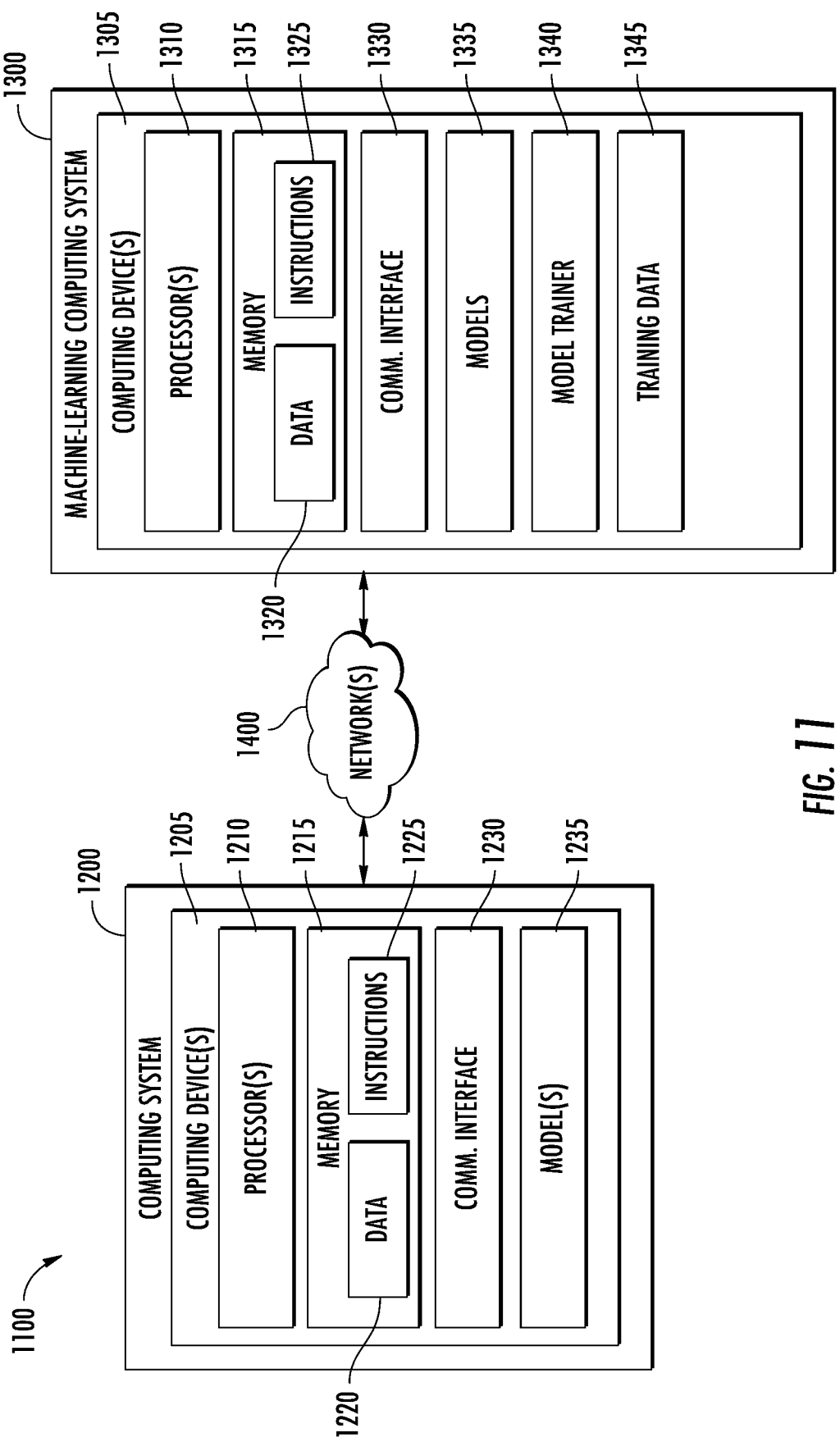
FIG. 11 is a block diagram of a computing system, according to some embodiments of the present disclosure.

FIG. 11 is a block diagram of an example computing system 1100, according to some embodiments of the present disclosure. The example system 1100 includes a computing system 1200 and a machine-learning computing system 1300 that are communicatively coupled over one or more networks 1400.

In some implementations, the computing system 1200 can perform one or more observation tasks such as, for example, by obtaining sensor data (e.g., two-dimensional, three-dimensional, etc.) associated with a dynamic object. In some implementations, the computing system 1200 can be included in a robotic platform. For example, the computing system 1200 can be on-board an autonomous vehicle. In other implementations, the computing system 1200 is not located on-board a robotic platform. The computing system 1200 can include one or more distinct physical computing devices 1205.

The computing system 1200 (or one or more computing device(s) 1205 thereof) can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, sensor data, two-dimensional data, three-dimensional, image data, LiDAR data, object model parameters, simulation data or any other data or information described herein. In some implementations, the computing system 1200 can obtain data from one or more memory device(s) that are remote from the computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system 1200) to perform any of the operations, functions, or methods/processes described herein, including, for example, obtaining sensor data, generating object model parameters, generating simulation data, etc.

According to an aspect of the present disclosure, the computing system 1200 can store or include one or more machine-learned models 1235. As examples, the machine-learned models 1235 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1200 can receive the one or more machine-learned models 1235 from the machine-learning computing system 1300 over network(s) 1400 and can store the one or more machine-learned models 1235 in the memory 1215. The computing system 1200 can then use or otherwise implement the one or more machine-learned models 1235 (e.g., by processor(s) 1210). In particular, the computing system 1200 can implement the machine-learned model(s) 1235 to generate initial object model parameters, simulation data including dynamic objects, etc.

The machine learning computing system 1300 can include one or more computing devices 1305. The machine learning computing system 1300 can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1320 that can be obtained, received, accessed, written, manipulated, created, or stored. The data 1320 can include, for instance, sensor data, two-dimensional data, three-dimensional, image data, LiDAR data, object model parameters, simulation data, data associated with models, or any other data or information described herein. In some implementations, the machine learning computing system 1300 can obtain data from one or more memory device(s) that are remote from the machine learning computing system 1300.

The memory 1315 can also store computer-readable instructions 1325 that can be executed by the one or more processors 1310. The instructions 1325 can be software written in any suitable programming language or can be implemented in hardware. Additionally, or alternatively, the instructions 1325 can be executed in logically or virtually separate threads on processor(s) 1310.

For example, the memory 1315 can store instructions 1325 that when executed by the one or more processors 1310 cause the one or more processors 1310 (the computing system) to perform any of the operations or functions described herein, including, for example, training a machine-learned object parameter estimation model, generating simulation data, etc.

In some implementations, the machine learning computing system 1300 includes one or more server computing devices. If the machine learning computing system 1300 includes multiple server computing devices, such server computing devices can operate according to various computing architectures, including, for example, sequential computing architectures, parallel computing architectures, or some combination thereof.

In addition, or alternatively to the model(s) 1235 at the computing system 1200, the machine learning computing system 1300 can include one or more machine-learned models 1335. As examples, the machine-learned models 1335 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1300 or the computing system 1200 can train the machine-learned models 1235 or 1335 through use of a model trainer 1340. The model trainer 1340 can train the machine-learned models 1235 or 1335 using one or more training or learning algorithms. One example training technique is backwards propagation of errors. In some implementations, the model trainer 1340 can perform supervised training techniques using a set of labeled training data. In other implementations, the model trainer 1340 can perform unsupervised training techniques using a set of unlabeled training data. By way of example, the model trainer 1340 can train the machine-learned object parameter estimation model through unsupervised energy minimization training techniques using the objective function described herein. The model trainer 1340 can perform a number of generalization techniques to improve the generalization capability of the models being trained. Generalization techniques include weight decays, dropouts, or other techniques.

The computing system 1200 and the machine learning computing system 1300 can each include a communication interface 1230 and 1330, respectively. The communication interfaces 1230/1330 can be used to communicate with one or more systems or devices, including systems or devices that are remotely located from the computing system 1200 and the machine learning computing system 1300. A communication interface 1230/1330 can include any circuits, components, software, etc. for communicating with one or more networks (e.g., 1400). In some implementations, a communication interface 1230/1330 can include, for example, one or more of a communications controller, receiver, transceiver, transmitter, port, conductors, software or hardware for communicating data.

The network(s) 1400 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1400 can be accomplished, for instance, through a network interface using any type of protocol, protection scheme, encoding, format, packaging, etc.

FIG. 11 illustrates one example system 1100 that can be used to implement the present disclosure. Other systems can be used as well. For example, in some implementations, the computing system 1200 can include the model trainer 1340 and the training dataset 1345. In such implementations, the machine-learned models 1335 can be both trained and used locally at the computing system 1200. As another example, in some implementations, the computing system 1200 is not connected to other computing systems.

In addition, components illustrated or discussed as being included in one of the computing systems 1200 or 1300 can instead be included in another of the computing systems 1200 or 1300. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

What is claimed is:

1. An autonomous vehicle computing system for controlling an autonomous vehicle, the autonomous vehicle computing system comprising:
one or more processors;
a machine-learned prediction system having one or more parameters configured by:
(a) receiving data indicative of a trajectory of a test autonomous vehicle comprising a plurality of footprints of the test autonomous vehicle at a corresponding plurality of time steps of a time frame;
(b) receiving testing object data indicative of a ground truth object trajectory of a test object in a test environment of the test autonomous vehicle;
(c) receiving, from the machine-learned prediction system, prediction data indicative of one or more predicted object trajectories in the test environment;
(d) evaluating the machine-learned prediction system using a performance metric that characterizes protection of exposed ground truth occupancy, wherein the performance metric is based at least in part on, for a respective footprint of the plurality of footprints of the test autonomous vehicle:
(i) a probability that the ground truth object trajectory occupies at least a portion of the respective footprint at a respective time step corresponding to the respective footprint; and
(ii) a probability that the respective footprint is not blocked by at least one of the one or more predicted object trajectories before the respective time step; and
(e) updating, based at least in part on the evaluating of the machine-learned prediction system using the performance metric, the machine-learned prediction system to improve a value of the performance metric; and
one or more computer-readable medium storing instructions that when executed by the one or more processors cause the autonomous vehicle computing system to perform operations, the operations comprising:
processing sensor data descriptive of an object in an environment of the autonomous vehicle;
generating, using the machine-learned prediction system, one or more predictions for the object; and
controlling the autonomous vehicle based on the one or more predictions.

2. The autonomous vehicle computing system of claim 1, wherein (e) comprises:
training, using the performance metric as an objective, the machine-learned prediction system.

3. The autonomous vehicle computing system of claim 1, comprising a machine-learned motion planning system;
wherein (a) comprises processing, using the machine-learned motion planning system, the prediction data from the machine-learned prediction system to generate the trajectory; and
wherein controlling the autonomous vehicle based on the one or more predictions comprises:
generating a motion plan using the machine-learned motion planning system based on the one or more predictions for the object; and
controlling the autonomous vehicle based on to the motion plan.

4. A computer-implemented method, comprising:
processing sensor data descriptive of an object in an environment of an autonomous vehicle;
generating, using a machine-learned prediction system of the autonomous vehicle, one or more predictions for the object, the machine-learned prediction system having one or more parameters configured by:
(a) receiving data indicative of a trajectory of a test autonomous vehicle comprising a plurality of footprints of the test autonomous vehicle at a corresponding plurality of time steps of a time frame;
(b) receiving testing object data indicative of a ground truth object trajectory of a test object in a test environment of the test autonomous vehicle;
(c) receiving, from the machine-learned prediction system, prediction data indicative of one or more predicted object trajectories in the test environment;
(d) evaluating the machine-learned prediction system using a performance metric that characterizes protection of exposed ground truth occupancy, wherein the performance metric is based at least in part on, for a respective footprint of the plurality of footprints of the test autonomous vehicle:

(i) a probability that the ground truth object trajectory occupies at least a portion of the respective footprint at a respective time step corresponding to the respective footprint; and
(ii) a probability that the respective footprint is not blocked by at least one of the one or more predicted object trajectories before the respective time step; and
(e) updating, based at least in part on the evaluating of the machine-learned prediction system using the performance metric, the machine-learned prediction system to improve a value of the performance metric; and
controlling the autonomous vehicle based on the one or more predictions.

5. The computer-implemented method of claim 4, wherein determining the probability that the respective footprint is not blocked by the at least one predicted object trajectory before the respective time step comprises:
determining a probability that the one or more predicted object trajectories do not overlap a preceding footprint at a preceding time step preceding the respective time step.

6. The computer-implemented method of claim 4, wherein the performance metric is based at least in part on a probability of the autonomous vehicle reaching the respective footprint during execution of the trajectory.

7. The computer-implemented method of claim 4, wherein the performance metric is based at least in part on a probability of the respective footprint not being blocked by another ground truth object at a preceding time step preceding the respective time step.

8. The computer-implemented method of claim 4, wherein the respective footprint comprises a plurality of vehicle cells within a spatio-temporal occupancy grid, wherein the spatio-temporal occupancy grid comprises a plurality of cells representative of the environment and the plurality of vehicle cells represent a region of fixed area within the environment corresponding to a body of the autonomous vehicle at the respective time step.

9. The computer-implemented method of claim 8, wherein the spatio-temporal occupancy grid is defined by path-relative coordinates adapted to an intended path of the autonomous vehicle, wherein the intended path of the autonomous vehicle is based at least in part on a road geometry associated with the environment.

10. The computer-implemented method of claim 9, wherein (a) comprises:
generating the data indicative of the trajectory of the autonomous vehicle based at least in part on the intended path of the autonomous vehicle; and
determining a trajectory probability for the trajectory, the trajectory probability indicative of a probability of the autonomous vehicle reaching the respective footprint during execution of the trajectory.

11. The computer-implemented method of claim 4, wherein the performance metric comprises an avoidance metric that correlates to recall of the ground truth object trajectories by the predicted object trajectories.

12. The computer-implemented method of claim 4, wherein (e) comprises:
training, using the performance metric as an objective, the machine-learned prediction system.

13. The computer-implemented method of claim 4, wherein (a) comprises:
generating, using a machine-learned motion planning system of the autonomous vehicle, the trajectory.

14. The computer-implemented method of claim 13, wherein the machine-learned motion planning system processes the prediction data from the machine-learned prediction system to generate the trajectory.

15. The computer-implemented method of claim 14, wherein the machine-learned prediction system processes sensor data descriptive of the environment.

16. The computer-implemented method of claim 13, wherein the machine-learned motion planning system generates a trajectory probability, the trajectory probability indicative of a probability of the autonomous vehicle reaching the respective footprint during execution of the trajectory.

17. One or more non-transitory computer-readable media storing:
a machine-learned prediction system having one or more parameters configured by:
(a) receiving data indicative of a trajectory of a test autonomous vehicle comprising a plurality of footprints of the test autonomous vehicle at a corresponding plurality of time steps of a time frame;
(b) receiving testing object data indicative of a ground truth object trajectory of a test object in a test environment of the test autonomous vehicle;
(c) receiving, from the machine-learned prediction system, prediction data indicative of one or more predicted object trajectories in the test environment;
(d) evaluating the machine-learned prediction system using a performance metric that characterizes protection of exposed ground truth occupancy, wherein the performance metric is based at least in part on, for a respective footprint of the plurality of footprints of the test autonomous vehicle:
(i) a probability that the ground truth object trajectory occupies at least a portion of the respective footprint at a respective time step corresponding to the respective footprint; and
(ii) a probability that the respective footprint is not blocked by at least one of the one or more predicted object trajectories before the respective time step; and
(e) updating, based at least in part on the evaluating of the machine-learned prediction system using the performance metric, the machine-learned prediction system to improve a value of the performance metric; and
instructions that when executed by one or more processors cause a computing system to perform operations, the operations comprising:
processing sensor data descriptive of an object in an environment of an autonomous vehicle;
generating, using the machine-learned prediction system, one or more predictions for the object; and
controlling the autonomous vehicle based on the one or more predictions.

18. The one or more non-transitory computer-readable media of claim 17, wherein (e) comprises:
training, using the performance metric as an objective, the machine-learned prediction system.

19. The one or more non-transitory computer-readable media of claim 17, storing:
a machine-learned motion planning system;
wherein (a) comprises processing, using the machine-learned motion planning system, the prediction data from the machine-learned prediction system to generate the trajectory; and
wherein controlling the autonomous vehicle based on the one or more predictions comprises:
generating a motion plan using the machine-learned motion planning system based on the one or more predictions for the object; and controlling the autonomous vehicle based on to the motion plan.

20. The one or more non-transitory computer-readable media of claim 17, wherein determining the probability that the respective footprint is not blocked by the at least one predicted object trajectory before the respective time step comprises:
- determining a probability that the one or more predicted object trajectories do not overlap the respective footprint at the respective time step, and
- determining a probability that the one or more predicted object trajectories do not overlap a preceding footprint at a preceding time step preceding the respective time step.

* * * * *